United States Patent
Li et al.

(10) Patent No.: US 11,777,103 B2
(45) Date of Patent: Oct. 3, 2023

(54) ELECTRODE PLATE, ELECTROCHEMICAL APPARATUS, BATTERY MODULE, BATTERY PACK, AND DEVICE

(71) Applicant: CONTEMPORARY AMPEREX TECHNOLOGY CO., LIMITED, Ningde (CN)

(72) Inventors: Jing Li, Ningde (CN); Qingrui Xue, Ningde (CN); Zige Zhang, Ningde (CN); Wei Li, Ningde (CN); Xianwei Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 421 days.

(21) Appl. No.: 17/132,548

(22) Filed: Dec. 23, 2020

(65) Prior Publication Data

US 2021/0151772 A1 May 20, 2021

Related U.S. Application Data

(63) Continuation of application No. PCT/CN2019/117142, filed on Nov. 11, 2019.

(30) Foreign Application Priority Data

Dec. 29, 2018 (CN) .......................... 201811644245.2

(51) Int. Cl.
*H01M 4/66* (2006.01)
*H01M 4/13* (2010.01)
(Continued)

(52) U.S. Cl.
CPC ............ *H01M 4/667* (2013.01); *H01M 4/13* (2013.01); *H01M 4/622* (2013.01); *H01M 4/625* (2013.01);
(Continued)

(58) Field of Classification Search
None
See application file for complete search history.

(56) References Cited

U.S. PATENT DOCUMENTS

| 5,478,676 A | 12/1995 | Turi et al. |
| 2004/0126654 A1 | 7/2004 | Sudano et al. |
| (Continued) | | |

FOREIGN PATENT DOCUMENTS

| CN | 204088469 U | 1/2015 |
| CN | 106654285 A | 5/2017 |
| (Continued) | | |

OTHER PUBLICATIONS

Machine Translation of Chinese Patent Publication No. 106654285 (Year: 2016).*

(Continued)

*Primary Examiner* — Wyatt P Mcconnell
(74) *Attorney, Agent, or Firm* — Kilpatrick Townsend & Stockton LLP

(57) ABSTRACT

This application relates to an electrode plate that includes a current collector and an electrode active material layer disposed on at least one surface of the current collector. The current collector includes a support layer and a conductive layer disposed on at least one surface of the support layer. A single-side thickness D2 of the conductive layer satisfies 30 nm≤D2≤3 μm. The electrode active material layer includes an electrode active material, a binder, and a conductive agent unevenly distributed in a thickness direction of the electrode active material layer. A weight percentage of the conductive agent in an interior area of the electrode active material layer is higher than that in an exterior area of the electrode active material layer.

16 Claims, 5 Drawing Sheets

(51) Int. Cl.
  *H01M 4/62* (2006.01)
  *H01M 10/0525* (2010.01)
  *H01M 4/02* (2006.01)

(52) U.S. Cl.
  CPC .......... *H01M 4/661* (2013.01); *H01M 4/663* (2013.01); *H01M 4/668* (2013.01); *H01M 10/0525* (2013.01); *H01M 2004/021* (2013.01)

(56) References Cited

U.S. PATENT DOCUMENTS

| | | | |
|---|---|---|---|
| 2010/0291442 A1 | 11/2010 | Wang et al. | |
| 2014/0072873 A1 | 3/2014 | Wang et al. | |
| 2018/0006291 A1* | 1/2018 | Kim | H01M 4/13 |
| 2018/0198132 A1 | 7/2018 | Liang et al. | |
| 2018/0301709 A1* | 10/2018 | Qiu | C23C 14/30 |

FOREIGN PATENT DOCUMENTS

| | | |
|---|---|---|
| CN | 107431186 A | 12/2017 |
| CN | 108281662 A | 7/2018 |
| CN | 108539252 A | 9/2018 |
| EP | 3367485 A1 | 8/2018 |
| JP | 2011165388 A | 8/2011 |
| JP | 2013254692 A | 12/2013 |

OTHER PUBLICATIONS

Contemporary Amperex Technology Co., Limited, International Search Report and Written Opinion, PCT/CN2019117142, dated Feb. 3, 2020, 14 pgs.

Ningder Age New Energy Technology Co. Ltd., First Office Action, CN201811644245.2, dated Jun. 9, 2020, 18 pgs.

Contemporary Amperex Technology Co., Limited, Extended European Search Report, EP19905423.0, dated Sep. 10, 2021, 9pgs.

Contemporary Amperex Technology Co., Limited, Communication Pursuant to Article 94(3), EPC, EP19905423.0, dated Feb. 6, 2023, 7 pgs.

Pszczółkowski, B. et al., A Comparative Analysis of Selected Methods for Determining Young's Modulus in Polylactic Acid Samples Manufactured with the FDM Method, Materials, MDPI, vol. 15, No. 1, Published Dec. 25, 2021, 11 pgs.

* cited by examiner

ELECTRODE PLATE, ELECTROCHEMICAL APPARATUS, BATTERY MODULE, BATTERY PACK, AND DEVICE

CROSS-REFERENCE TO RELATED APPLICATIONS

This application is a continuation application of PCT Patent Application No. PCT/CN2019/117142, entitled "ELECTRODE PLATE, ELECTROCHEMICAL DEVICE, BATTERY MODULE, BATTERY PACK, AND EQUIPMENT" filed on Nov. 11, 2019, which claims priority to Chinese Patent Application No. 201811644245.2, filed with the State Intellectual Property Office of the People's Republic of China on Dec. 29, 2018, and entitled "ELECTRODE PLATE, ELECTROCHEMICAL APPARATUS, BATTERY MODULE, BATTERY PACK, AND DEVICE", all of which are incorporated herein by reference in their entirety.

TECHNICAL FIELD

This application relates to the battery field, and specifically, to an electrode plate, an electrochemical apparatus, a battery module, a battery pack, and a device.

BACKGROUND

Lithium-ion batteries have advantages such as high energy density, high output power, long cycle life, and low environmental pollution, and therefore are extensively applied in electric vehicles and consumer electronic products. As the application scope of the lithium-ion batteries is continuously expanded, people have higher requirements on weight energy density and volume energy density of the lithium-ion batteries.

To obtain a lithium-ion battery with high weight energy density and volume energy density, the following improvements are generally made to the lithium-ion battery: (1) choosing a positive electrode material or a negative electrode material with a high specific discharge capacity; (2) optimizing a mechanical design of the lithium-ion battery to minimize a volume of the lithium-ion battery; (3) selecting a positive electrode plate or a negative electrode plate with high compacted density; and (4) reducing weights of components of the lithium-ion battery.

Improvements to a current collector generally include selecting a current collector with a light weight or small thickness. For example, a current collector with punched holes or a plastic current collector coated with a metal layer may be used.

For an electrode plate and a battery that use a plastic current collector coated with a metal layer, although energy density is increased, some performance degradations may be caused in terms of machinability, safety performance, electrical performance, and the like. To obtain an electrode plate and a current collector with good electrochemical performance, a plurality of improvements are still needed.

SUMMARY

In view of this, this application provides an electrode plate, an electrochemical apparatus, a battery module, a battery pack, and a device According to a first aspect, this application provides an electrode plate that has a current collector and an electrode active material layer disposed on at least one surface of the current collector. The current collector includes a support layer and a conductive layer disposed on at least one surface of the support layer, and a single-side thickness D2 of the conductive layer satisfies 30 nm≤D2≤3 µm. The electrode active material layer includes an electrode active material, a binder, and a conductive agent. The conductive agent is unevenly distributed in a thickness direction of the electrode active material layer, and a weight percentage of the conductive agent in an interior area of the electrode active material layer is higher than a weight percentage of the conductive agent in an exterior area of the electrode active material layer.

According to a second aspect, this application relates to an electrochemical apparatus, including a positive electrode plate, a negative electrode plate, a separator, and an electrolyte, where the positive electrode plate and/or the negative electrode plate are/or the electrode plate in the first aspect of this application.

According to a third aspect, this application relates to a battery module, including the electrochemical apparatus in the second aspect of this application.

According to a fourth aspect, this application relates to a battery pack, including the battery module in the third aspect of this application.

According to a fifth aspect, this application relates to a device, including the electrochemical apparatus in the second aspect of this application, where the electrochemical apparatus is used as a power supply for the device; and preferably, the device includes a mobile device, an electric vehicle, an electric train, a satellite, a ship, and an energy storage system.

The technical solutions of this application have at least the following beneficial effects:

The electrode active material layer is divided into two areas in the thickness direction: the interior area and the exterior area. Conductivity of the interior area is higher than that of the exterior area. An electrochemical capacity of the exterior area is higher than that of the interior area. The interior area of the electrode active material layer can improve a composite current collector interface, increase a bonding force between the current collector and the electrode active material layer, and ensure that the electrode active material layer is more firmly disposed on the surface of the composite current collector. In addition, this can properly overcome disadvantages such as poor conductivity of the composite current collector and vulnerability to damage of the conductive layer of the composite current collector. Because a conductive network between the current collector and an active substance in the electrode active material layer is effectively repaired and established, electronic transmission efficiency is improved, and resistance between the current collector and the electrode active material layer is reduced. Therefore, direct current resistance in a cell can be effectively reduced, power performance of the cell is improved, and it is ensured that phenomena such as great polarization and lithium precipitation do not easily occur in a long cycling process of the cell, that is, long-term reliability of the cell is effectively improved. Therefore, the electrode plate and electrochemical apparatus in this application have good balanced electrical performance, safety performance, and machinability.

Because the electrochemical apparatus is included, the battery module, battery pack, and device in this application have at least the same advantages as the electrochemical apparatus.

BRIEF DESCRIPTION OF DRAWINGS

The following describes a positive electrode plate, an electrochemical apparatus, and beneficial effects thereof in this application in detail with reference to the accompanying drawings and specific embodiments.

FIG. 1 is a schematic structural diagram of a positive electrode current collector according to a specific embodiment of this application.

In the drawings.

Figure 1:
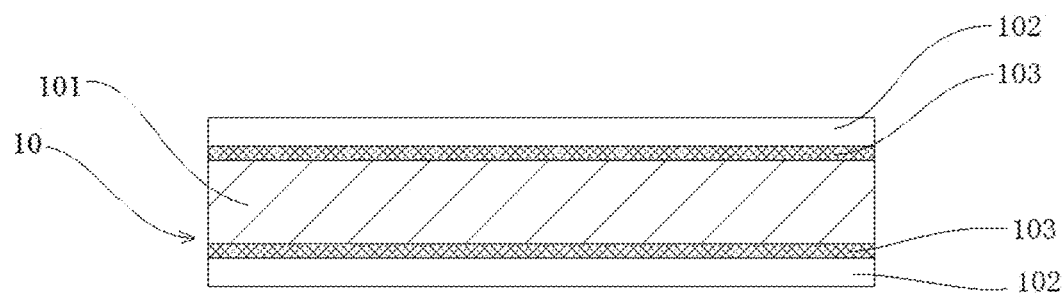

1. battery pack;
2. upper case;
3. lower case;
4. battery module;
5. electrochemical apparatus;
10. positive electrode current collector;
101. positive electrode support layer;
102. positive electrode conductive layer;
103. positive electrode protection layer;
11. positive electrode active material layer;
20. negative electrode current collector;
201. negative electrode support layer;
202. negative electrode conductive layer;
203. negative electrode protection layer; and
21. negative electrode active material layer.

DESCRIPTION OF EMBODIMENTS

The following further describes this application with reference to specific embodiments. It should be understood that these specific embodiments are merely intended to describe this application but not to limit the scope of this application.

A first aspect of this application relates to an electrode plate, including a current collector and an electrode active material layer disposed on at least one surface of the current collector, where the current collector includes a support layer and a conductive layer disposed on at least one surface of the support layer, a single-side thickness D2 of the conductive layer satisfies 30 nm≤D2≤3 μm, the electrode active material layer includes an electrode active material, a binder, and a conductive agent, the conductive agent in the electrode active material layer is unevenly distributed in a thickness direction, and based on a total weight of the electrode active material layer, a weight percentage of the conductive agent in an interior area of the electrode active material layer is higher than a weight percentage of the conductive agent in an exterior area of the electrode active material layer.

Apparently, the electrode plate may be a positive electrode plate or a negative electrode plate. When the electrode plate is a positive electrode plate, correspondingly, the current collector and the electrode active material layer are respectively a positive electrode current collector and a positive electrode active material layer. When the electrode plate is a negative electrode plate, correspondingly, the current collector and the electrode active material layer are respectively a negative electrode current collector and a negative electrode active material layer.

The current collector used for the electrode plate in the first aspect of this application is a composite current collector, and the composite current collector is formed by at least two materials. Structurally, the current collector includes the support layer and the conductive layer disposed on the at least one surface of the support layer, and the single-side thickness D2 of the conductive layer satisfies 30 nm≤D2≤3 μm. Therefore, the conductive layer in the current collector has a conductive function. The thickness D2 of the conductive layer is far less than a thickness of a common metal current collector such as an Al foil or a Cu foil in the prior art (thicknesses of common Al foil and Cu foil metal current collectors are generally 12 μm and 8 μm). Therefore, weight energy density and volume energy density of an electrochemical apparatus (for example, a lithium battery) using the electrode plate can be increased. In addition, when the composite current collector is used as a positive electrode current collector, safety performance of the positive electrode plate in nail penetration can also be greatly improved.

However, because the conductive layer of the composite current collector is thin, conductivity of the composite current collector is poorer than conductivity of a conventional metal current collector (Al foil or Cu foil), and the conductive layer may be easily damaged in an electrode plate machining process, which further affects electrical performance of the electrochemical apparatus. In addition, in an electrode plate rolling process or the like, the support layer (polymeric material or polymeric composite material) of the composite current collector has greater bounce than a conventional metal current collector. Therefore, a bonding force between the support layer and the conductive layer and a bonding force between the composite current collector and the electrode active material layer both need to be enhanced preferably through interface improvement.

In the electrode plate according to this application, the conductive agent is unevenly distributed in the thickness direction in the electrode active material layer disposed on the current collector. Specifically, the electrode active material layer is divided into two areas in the thickness direction: the interior area and the exterior area, and content of the conductive agent in the interior area of the electrode active material layer is higher than content of the conductive agent in the exterior area of the electrode active material layer. To be specific, conductivity of one side (interior area) of the electrode active material layer in contact with the current collector is higher. This can properly overcome disadvantages such as poor conductivity of the composite current collector and vulnerability to damage of the conductive layer of the composite current collector. The higher-conductivity interior area of the electrode active material layer effectively repairs and establishes a conductive network between the current collector and an active substance in the electrode active material layer to improve electronic transmission efficiency and reduce resistance of the electrode plate including the composite current collector. Therefore, direct current resistance (DCR) in a cell can be effectively reduced, power performance of the cell is improved, and it is ensured that phenomena such as great polarization and lithium precipitation do not easily occur in a long cycling process of the cell, that is, long-term reliability of the cell is effectively improved.

The following describes in detail a structure, material, performance, and the like of the electrode plate (and the current collector in the electrode plate) in an embodiment of this application.

[Conductive Layer of the Current Collector]

In comparison with a conventional metal current collector, in the current collector in an embodiment of this application, the conductive layer has a conductive function and a current collection function, and is configured to provide electrons for the electrode active material layer.

A material of the conductive layer is selected from at least one of a metal conductive material and a carbon-based conductive material.

The metal conductive material is preferably selected from at least one of aluminum, copper, nickel, titanium, silver, a nickel-copper alloy, and an aluminum-zirconium alloy.

The carbon-based conductive material is preferably selected from at least one of graphite, acetylene black, graphene, a carbon nano-tube.

The material of the conductive layer is preferably the metal conductive material, that is, the conductive layer is preferably a metal conductive layer. When the current collector is a positive electrode current collector, aluminum is generally used as the material of the conductive layer. When the current collector is a negative electrode current collector, copper is generally used as the material of the conductive layer.

When conductivity of the conductive layer is poor or the thickness of the conductive layer is excessively small, great resistance and great polarization are caused in the battery. When the thickness of the conductive layer is excessively great, the conductive layer cannot improve weight energy density and volume energy density of the battery.

The single-side thickness of the conductive layer is $D2$, and $D2$ preferably satisfies 30 nm≤$D2$≤3 μm, more specifically, 300 nm≤$D2$≤2 μm, and most preferably, 500 nm≤$D2$≤1.5 μm, to better ensure both a light weight and good conductivity of the current collector.

In an embodiment of this application, an upper limit of the single-side thickness $D2$ of the conductive layer may be 3 μm, 2.5 μm, 2 μm, 1.8 μm, 1.5 μm, 1.2 μm, 1 μm, or 900 nm; a lower limit of the single-side thickness $D2$ of the conductive layer may be 800 nm, 700 nm, 600 nm, 500 nm, 450 nm, 400 nm, 350 nm, 300 nm, 100 nm, 50 nm, or 30 nm. A range of the single-side thickness $D2$ of the conductive layer may include any numeric value of the upper limit or the lower limit. Specifically, 300 nm≤$D2$≤2 μm. More specifically, 500 nm≤$D2$≤1.5 μm.

Because the thickness of the conductive layer in this application is small, damage such as a crack may be easily generated in an electrode plate preparation process or the like. In this case, the electrode active material layer introduced in the electrode plate and having the conductive agent unevenly distributed in the thickness direction according to this application may buffer and protect the conductive layer, and may form "a repair layer" on a surface of the conductive layer, to improve the bonding force and contact resistance between the current collector and the active material layer.

Generally, a crack exists in the conductive layer of the electrode plate in this application. The crack in the conductive layer generally exists in the conductive layer irregularly. It may be a long strip-shaped crack, or may be a cross-shaped crack, or may be a scattering crack, or may be a crack that penetrates the entire conductive layer, or may be a crack formed on the surface of the conductive layer. The crack in the conductive layer is generally caused by rolling, an excessively great amplitude of a tab during welding, an excessively great tension in substrate rolling-up, or the like in the electrode plate machining process.

The conductive layer may be formed on the support layer by using at least one of mechanical rolling, bonding, vapor deposition (vapor deposition), and electroless plating (Electroless Plating). The vapor deposition method is preferably a physical vapor deposition (Physical Vapor Deposition, PVD) method. The vapor deposition method is preferably at least one of an evaporation method and a sputtering method. The evaporation method is preferably at least one of a vacuum evaporating method, a thermal evaporation deposition method, and an electron beam evaporation method. The sputtering method is preferably a magnetron sputtering method.

At least one of the vapor deposition method or the electroless plating method is preferred, so that bonding between the support layer and the conductive layer is firmer.

[Support Layer of the Current Collector]

In the current collector in an embodiment of this application, the support layer has functions of supporting and protecting the conductive layer. Because the support layer generally uses an organic polymeric material, density of the support layer is generally less than density of the conductive layer. Therefore, weight energy density of the battery can be significantly increased in comparison with a conventional metal current collector.

Moreover, a metal layer having a small thickness is used as the metal layer, so that weight energy density of the battery can be further increased. In addition, because the support layer can properly carry and protect the conductive layer located on the surface of the support layer, a common phenomenon of electrode crack for conventional current collectors is unlikely to occur.

A material of the support layer is selected from at least one of an insulating polymeric material, an insulating polymeric composite material, a conductive polymeric material, and a conductive polymeric composite material.

For example, the insulating polymeric material is selected from at least one of polyamide, polyterephthalate, polyimide, polyethylene, polypropylene, polystyrene, polyvinyl chloride, aramid fiber, polydiformylphenylenediamine, acrylonitrile-butadiene-styrene copolymer, polybutylene terephthalate, poly-p-phenylene terephthamide, polypropylene ethylene), polyoxymethylene, epoxy resin, phenolic resin, polytetrafluoroethylene, p-phenylene sulfide, polyvinylidene fluoride, silicon rubber, polycarbonate, cellulose and a derivative thereof, amylum and a derivative thereof, protein and a derivative thereof, polyvinyl alcohol and a crosslinking agent thereof, and polyethylene glycol and a crosslinking agent thereof.

For example, the insulating polymeric composite material is selected from a composite material formed by an insulating polymeric material and an inorganic material, where the inorganic material is preferably selected from at least one of a ceramic material, a glass material, and a ceramic composite material.

For example, the conductive polymeric material is selected from a polymeric polysulfur nitride material, or a doped conjugated polymeric material, for example, at least one of polypyrrole, polyacetylene, polyaniline, and polythiophene.

For example, the conductive polymeric composite material is selected from a composite material formed by an insulating polymeric material and a conductive material, where the conductive material is selected from at least one of a conductive carbon material, a metal material, and a composite conductive material, the conductive carbon material is selected from at least one of carbon black, a carbon nano-tube, graphite, acetylene black, and graphene, the metal material is selected from at least one of nickel, iron, copper, aluminum, or an alloy thereof, and the composite conductive material is selected from at least one of nickel-coated graphite powder and nickel-coated carbon fiber.

A person skilled in the art may properly select and determine the material of the support layer based on factors such as actual requirements in an application environment and costs. In this application, the material of the support layer is preferably an insulating polymeric material or an insulating polymeric composite material, especially when the current collector is a positive electrode current collector.

When the current collector is a positive electrode current collector, a special current collector that is supported by an insulating layer and has a specific thickness may be used to apparently improve safety performance of the battery. Because the insulating layer is non-conductive, its resistance is great. Therefore, when a short circuit occurs in the battery in an abnormal case, short circuit resistance can be increased, and a short circuit current can be greatly reduced. Therefore, heat generated in the short circuit can be greatly reduced, and safety performance of the battery can be improved.

In addition, because the conductive layer is thin, the conductive network is locally cut off in an abnormal case such as nail penetration, to avoid a short circuit in a large area of the electrochemical apparatus or even in the entire electrochemical apparatus. Therefore, damage caused by nail penetration or the like to the electrochemical apparatus can be limited to a penetration point, and only "a point open circuit" is formed, without affecting normal working of the electrochemical apparatus in a period of time.

A thickness of the support layer is D1, and D1 preferably satisfies 1 μm≤D1≤30 μm, and more specifically, 1 μm≤D1≤15 μm.

If the support layer is excessively thin, mechanical strength of the support layer is insufficient, and the support layer may easily crack in the electrode plate machining process or the like. If the support layer is excessively thick, volume energy density of the battery using the current collector is reduced.

An upper limit of the thickness D1 of the support layer may be 30 μm, 25 μm, 20 μm, 15 μm, 12 μm, 10 μm, or 8 μm. A lower limit of the thickness D1 may be 1 μm, 1.5 μm, 2 μm, 3 μm, 4 μm, 5 μm, 6 μm, or 7 μm. A range of the thickness D1 of the support layer may include any numeric value of the upper limit or the lower limit. Specifically, 1 μm≤D1≤15 μm; more specifically, 2 μm≤D1≤10 μm; and most preferably, 3 μm≤D1≤8 μm.

In addition, the specific thickness in this application can further ensure that the current collector has great resistance, and significantly reduce a battery temperature increase when a short circuit occurs in the battery. When the conductive layer is made of aluminum, this can further significantly reduce or prevent a thermite reaction of the positive electrode current collector, and ensure good safety performance of the battery.

In addition, when the conductive layer is a metal conductive layer, a room-temperature Young's modulus of the support layer preferably satisfies 20 Gpa≥E≥4 Gpa.

In this application, a method for testing the room-temperature Young's modulus of the support layer is as follows:

taking a support layer sample, and cutting the sample to 15 mm×200 mm; using a ten-thousandth micrometer to measure a thickness h (μm) of the sample; using a drawing machine tensile machine to perform a tensile test at a room temperature, setting an initial position, and fixing a length of the sample between jigs to 50 mm; performing stretching at a speed of 50 mm/min, and recording a load L (N) and a device displacement y (mm) when stretching to crack, where stress c=L/(15*h)*1000, and strain η=y/50*100; and drawing a stress-strain curve, and taking a curve in an initial linear area, where a slope of the curve is a Young's modulus E.

Metal is more rigid, that is, less deformed in the electrode plate machining process such as rolling, than a polymeric material or polymeric composite material. Therefore, to ensure that a deformation difference between the support layer and the conductive layer is not excessively great, which may otherwise cause the conductive layer to crack, the room-temperature Young's modulus of the support layer preferably satisfies 20 Gpa≥E≥4 Gpa, so that the support layer can have certain rigidity and that matching of rigidity between the support layer and the conductive layer can be further improved. In this way, it is ensured that the deformation difference between the support layer and the conductive layer is not excessively great in a machining process of the current collector and the electrode plate.

Because the support layer has certain rigidity (20 Gpa≥E≥4 Gpa), the current collector is unlikely to deform or extend excessively in the machining process of the current collector and the electrode plate. Therefore, the conductive layer can be firmly bonded to the support layer and is unlikely to fall off, and damage of the conductive layer caused by "passive" extension of the conductive layer can be prevented. In addition, the current collector according to this application has certain tenacity, so that the current collector and the electrode plate have certain capabilities to withstand deformation and do not easily crack.

However, the Young's modulus of the support layer cannot be excessively great; otherwise, there is difficulty in rolling up and winding, and machinability becomes poor. When 20 Gpa≥E, it can be ensured that the support layer has certain flexibility, and the electrode plate can also have a certain capability to withstand deformation.

In addition, a thermal shrinkage rate of the support layer at 90° C. is preferably not higher than 1.5%. Therefore, thermal stability of the current collector in the electrode plate machining process can be better ensured.

[Protection Layer of the Current Collector]

In some preferred embodiments of this application, the current collector is further provided with a protection layer. The protection layer is disposed on one surface of the conductive layer of the current collector or disposed on two surfaces of the conductive layer of the current collector, that is, a surface of the conductive layer away from the support layer and a surface facing the support layer.

The protection layer may be a metal protection layer or a metal oxide protection layer. The protection layer can prevent the conductive layer of the current collector from being broken by chemical corrosion or mechanical damage. In addition, the protection layer can further enhance mechanical strength of the current collector.

Specifically, protection layers are disposed on the two surfaces of the conductive layer of the current collector. A lower protection layer of the conductive layer (that is, a protection layer disposed on the surface of the conductive layer that faces the support layer) can not only prevent the conductive layer from being damaged and enhance mechanical strength of the current collector, but also enhance the bonding force between the support layer and the conductive layer and prevent film detachment (that is, the conductive layer is detached from the support layer).

A technical effect of an upper protection layer of the conductive layer (that is, a protection layer disposed on the surface of the conductive layer away from the support layer) is mainly to prevent the conductive layer from being destructed or corroded or the like in the machining process (for example, the surface of the conductive layer may be affected by immersion in an electrolyte or rolling). In the electrode plate in this application, the higher-conductivity interior area of the electrode active material layer is used to repair a possible crack generated in a process of rolling, winding, or the like, enhance conductivity, and compensate for disadvantages of the composite current collector used as a current collector. Therefore, the upper protection layer of the conductive layer and the interior area of the electrode active material layer can cooperate to further protect the conductive layer, and jointly improve conducting performance of the composite current collector used as a current collector.

Thanks to good conductivity, the metal protection layer can not only further improve mechanical strength and corrosion resistance of the conductive layer, but also reduce polarization of the electrode plate. For example, a material of the metal protection layer is selected from at least one of nickel, chromium, a nickel-based alloy, and a cooper-based alloy, and is preferably nickel or a nickel-based alloy.

The nickel-based alloy is an alloy formed by adding one or more other elements to a pure nickel matrix, and is preferably a nickel-chromium alloy. The nickel-chromium alloy is an alloy formed by metal nickel and metal chromium. Optionally, a molar ratio of a nickel element to a chromium element is 1:99 to 99:1.

The cooper-based alloy is an alloy formed by adding one or more other elements to a pure cooper matrix, and is preferably a copper-nickel alloy. Optionally, in the copper-nickel alloy, a molar ratio of a nickel element to a copper element is 1:99 to 99:1.

When metal oxide is used for the protection layer, because the metal oxide has low ductility, a large specific surface area, and great hardness, the protection layer can also provide effective support and protection for the conductive layer, and have a good technical effect for improving the bonding force between the support layer and the conductive layer. For example, a material of the metal oxide protection layer is selected from at least one of aluminum oxide, cobalt oxide, chromium oxide, and nickel oxide.

When used as a positive electrode current collector, the composite current collector according to this application preferably uses metal oxide as its protection layer to further improve safety performance of the positive electrode plate and battery while achieving a good technical effect of support and protection. When used as a negative electrode current collector, the composite current collector according to this application preferably uses metal as its protection layer to further improve conductivity of the electrode plate and kinetic performance of the battery to further reduce polarization of the battery, while achieving a good technical effect of support and protection.

A thickness of the protection layer is D3, and D3 preferably satisfies $D3 \leq \frac{1}{10} D2$, and $1 \text{ nm} \leq D3 \leq 200 \text{ nm}$. If the protection layer is excessively thin, the conductive layer cannot be protected sufficiently. If the protection layer is excessively thick, weight energy density and volume energy density of the battery may be reduced. Specifically, $5 \text{ nm} \leq D3 \leq 500 \text{ nm}$; more specifically, $10 \text{ nm} \leq D3 \leq 200 \text{ nm}$; and most preferably, $10 \text{ nm} \leq D3 \leq 50 \text{ nm}$.

Materials of the protection layers located on the two surfaces of the conductive layer may be the same or different, and thicknesses thereof may be the same or different.

Specifically, a thickness of the lower protection layer is less than a thickness of the upper protection layer. This helps improve weight energy density of the battery.

Further optionally, a proportional relationship between a thickness D3" of the lower protection layer and a thickness D3' of the upper protection layer is: $\frac{1}{2} D3' \leq D3'' \leq \frac{4}{5} D3'$.

When the current collector is a positive electrode current collector, aluminum is generally used as the material of the conductive layer, and a metal oxide material is preferably used as a material of the lower protection layer. In comparison with metal used as the material of the lower protection layer, the metal oxide material has greater resistance. Therefore, this type of lower protection layer can further increase resistance of the positive electrode current collector to some extent, further increase short circuit resistance when a short circuit occurs in the battery in an abnormal case, and improve safety performance of the battery. In addition, because a specific surface area of the metal oxide is larger, a bonding force between the lower protection layer made of the metal oxide material and the support layer is enhanced. In addition, because the specific surface area of the metal oxide is larger, the lower protection layer can increase roughness of the surface of the support layer, enhance the bonding force between the conductive layer and the support layer, and increase overall strength of the current collector.

When the current collector is a negative electrode current collector, cooper is generally used as the material of the conductive layer, and a metal material is preferably used as the material of the protection layer. More specifically, on a basis of including at least one metal protection layer, at least one of the lower protection layer and the lower protection layer further includes a metal oxide protection layer, to improve both conductivity and an interface bonding force of the negative electrode composite current collector.

[Current Collector]

FIG. 1 to FIG. 8 show schematic structural diagrams of current collectors used in electrode plates in some embodiments of this application.

Schematic diagrams of positive electrode current collectors are shown in FIG. 1 to FIG. 4.

In FIG. 1, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protection layers 103, that is, lower protection layers, disposed on lower surfaces of the positive electrode current collector conductive layers 102 (that is, surfaces facing the positive electrode current collector support layer 101).

Figure 2:
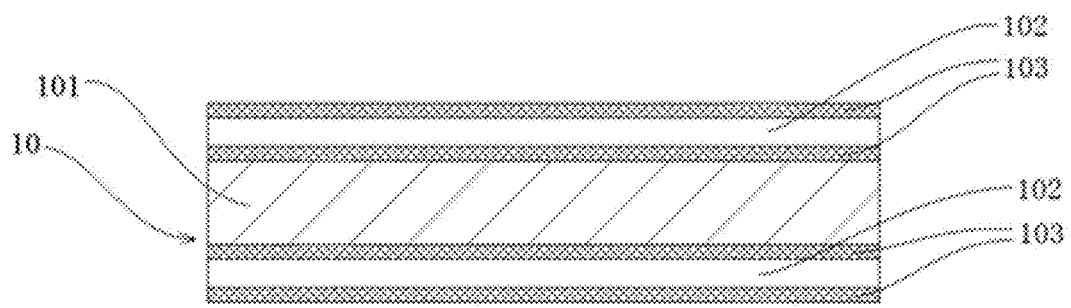
FIG. 2 is a schematic structural diagram of a positive electrode current collector according to another specific embodiment of this application.

In FIG. 2, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protection layers 103, that is, lower protection layers and upper protection layers, disposed on two opposite surfaces of the positive electrode current collector conductive layers 102.

Figure 3:
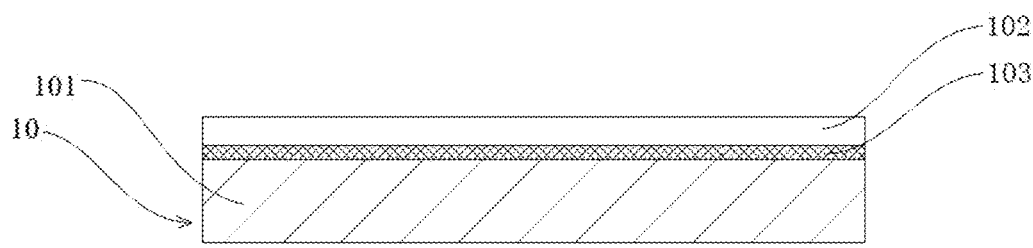
FIG. 3 is a schematic structural diagram of a positive electrode current collector according to another specific embodiment of this application.

In FIG. 3, a positive electrode current collector 10 includes a positive electrode current collector support layer 101 and a positive electrode current collector conductive layer 102 disposed on one surface of the positive electrode current collector support layer 101, and further includes a positive electrode current collector protection layer 103, that is, a lower protection layer, disposed on a surface of the positive electrode current collector conductive layer 102 that faces the positive electrode current collector support layer 101.

Figure 4:
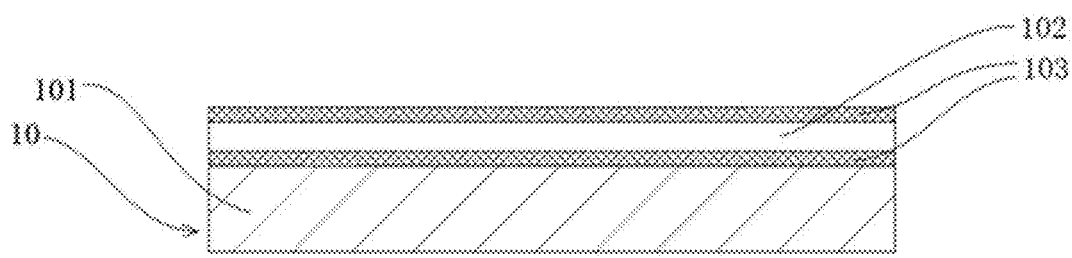
FIG. 4 is a schematic structural diagram of a positive electrode current collector according to another specific embodiment of this application.

In FIG. 4, a positive electrode current collector 10 includes a positive electrode current collector support layer 101 and a positive electrode current collector conductive layer 102 disposed on one surface of the positive electrode current collector support layer 101, and further includes positive electrode current collector protection layers 103, that is, a lower protection layer and an upper protection layer, disposed on two opposite surfaces of the positive electrode current collector conductive layer 102.

Likewise, schematic diagrams of negative electrode current collectors are shown in FIG. 5 to FIG. 8.

Figure 5:
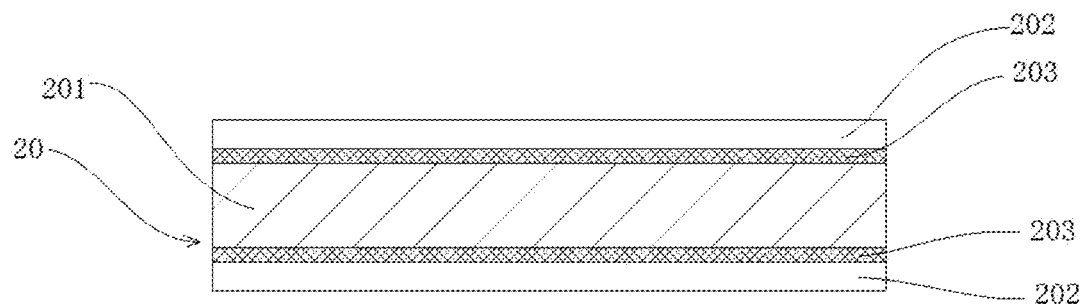
FIG. 5 is a schematic structural diagram of a negative electrode current collector according to a specific embodiment of this application.

In FIG. 5, a negative electrode current collector 20 includes a negative electrode current collector support layer 201 and negative electrode current collector conductive layers 202 that are disposed on two opposite surfaces of the negative electrode current collector support layer 201, and further includes negative electrode current collector protection layers 203, that is, lower protection layers, disposed on surfaces of the negative electrode current collector conductive layers 202 that face the negative electrode current collector support layer 201.

Figure 6:
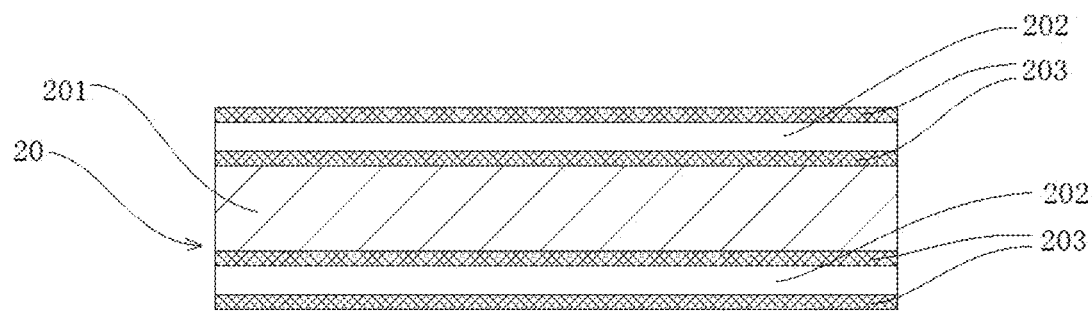
FIG. 6 is a schematic structural diagram of a negative electrode current collector according to another specific embodiment of this application.

In FIG. 6, a negative electrode current collector 20 includes a negative electrode current collector support layer 201 and negative electrode current collector conductive layers 202 that are disposed on two opposite surfaces of the negative electrode current collector support layer 201, and further includes negative electrode current collector protection layers 203, that is, lower protection layers and upper protection layers, disposed on two opposite surfaces of the negative electrode current collector conductive layers 202.

Figure 7:
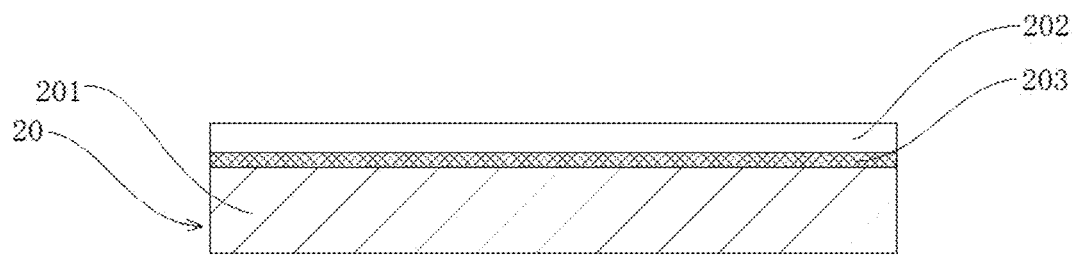
FIG. 7 is a schematic structural diagram of a negative electrode current collector according to another specific embodiment of this application.

In FIG. 7, a negative electrode current collector 20 includes a negative electrode current collector support layer 201 and a negative electrode current collector conductive layer 202 disposed on one surface of the negative electrode current collector support layer 201, and further includes a negative electrode current collector protection layer 203, that is, a lower protection layer, disposed on the negative electrode current collector conductive layer 202 in face of the negative electrode current collector support layer 201.

Figure 8:
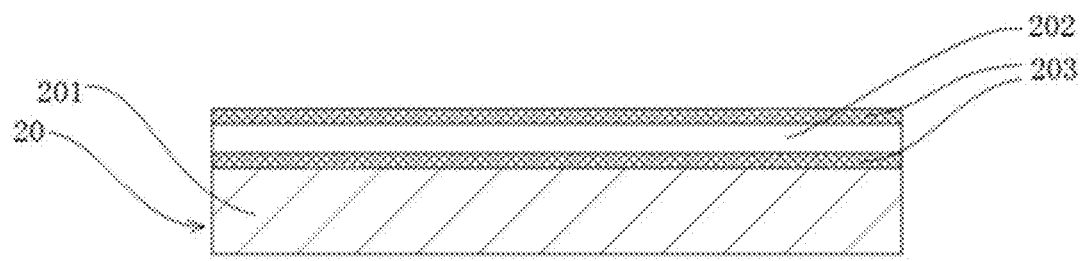
FIG. 8 is a schematic structural diagram of a negative electrode current collector according to another specific embodiment of this application.

In FIG. 8, a negative electrode current collector 20 includes a negative electrode current collector support layer 201 and a negative electrode current collector conductive layer 202 disposed on one surface of the negative electrode current collector support layer 201, and further includes negative electrode current collector protection layers 203, that is, a lower protection layer and an upper protection layer, disposed on two opposite surfaces of the negative electrode current collector conductive layer 202.

Materials of the protection layers located on the two opposite surfaces of the conductive layer may be the same or different, and thicknesses thereof may be the same or different.

For the current collector used for the electrode plate according to this application, conductive layers may be disposed on two opposite surfaces of the support layer, as shown in FIG. 1, FIG. 2, FIG. 5, and FIG. 6; or a conductive layer may be disposed on only one surface of the support layer, as shown in FIG. 3, FIG. 4, FIG. 7, and FIG. 8.

In addition, although the composite current collector used for the electrode plate in this application preferably includes the protection layer of the current collector as shown in FIG. 1 to FIG. 8, it should be understood that the protection layer of the current collector is not a necessary structure of the current collector. In some embodiments, the used current collector may not include the protection layer of the current collector.

[Electrode Active Material Layer of the Electrode Plate]

The electrode active material layer used for the electrode plate in this application generally includes an electrode active material, a binder, and a conductive agent. Based on a requirement, the electrode active material layer may further include other optional additives or auxiliaries.

For the electrode plate in this application, an average particle diameter D50 of the active material in the electrode active material layer is preferably 5 μm to 15 μm. If D50 is excessively small, after compaction, a porosity of the electrode plate is small and disadvantageous for infiltration of an electrolyte, and a large specific surface area of the electrode plate is likely to produce a plurality of side reactions with the electrolyte, hence reducing reliability of the cell. If D50 is excessively large, great damage may be easily caused to the composite current collector in an electrode plate compaction process. D50 is a corresponding particle diameter when a cumulative volume percentage of the active material reaches 50%, that is, a median particle diameter in volume distribution. For example, D50 may be measured by using a laser diffraction particle diameter distribution measuring instrument (for example, Malvern Mastersizer 3000).

For a positive electrode plate, various common electrode active materials in the art (that is, positive electrode active materials) may be used. For example, for the lithium battery, a positive electrode active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, and the like. However, this application is not limited to these materials, and may further use other conventional well-known materials that can be used as positive electrode substances of the lithium-ion battery. One of these positive electrode active materials may be used alone, or two or more may be used in combination. Specifically, the positive electrode active material may be selected from one or more of $LiCoO_2$, $LiNiO_2$, $LiMnO_2$, $LiMn_2O_4$, $LiNi⅓Co⅓Mn⅓O_2$ (NCM333), $LiNi0.5Co0.2Mn0.3O_2$ (NCM-523), $LiNi0.6Co0.2Mn0.2O_2$ (NCM622), $LiNi0.8Co0.1Mn0.1O_2$ (NCM811), $LiNi0.85Co0.15Al0.05O_2$, $LiFePO_4$, and $LiMnPO_4$.

For a negative electrode plate, various common electrode active materials in the art (that is, negative electrode active materials) may be used. For example, for the lithium battery, a negative electrode active material may be selected from carbon materials such as graphite (artificial graphite or natural graphite), conductive carbon black, and carbon fiber, metal or semimetal materials or alloys thereof such as Si, Sn, Ge, Bi, Sn, and In, lithium nitride or lithium oxide, lithium metal or a lithium alloy, and the like.

The conductive agent used in the electrode active material layer is preferably at least one of a conductive carbon material and a metal material.

For example, the conductive carbon material is selected from at least one of zero-dimensional conductive carbon (such as acetylene black or conductive carbon black), one-dimensional conductive carbon (such as a carbon nanotube), two-dimensional conductive carbon (such as conductive graphite or graphene), and three-dimensional conductive carbon (such as reduced graphene oxide); and the metal material is selected from at least one of aluminum powder, iron powder, and silver powder.

An important feature of the electrode plate in this application is that the conductive agent in the electrode active material layer is unevenly distributed in the thickness direction, that is, the weight percentage of the conductive agent in the electrode active material layer is uneven and varying. More specifically, based on the total weight of the electrode active material layer, the weight percentage of the conductive agent in the interior area of the electrode active material layer (which may also be referred to as "a lower-layer electrode active material") is higher than the weight percentage of the conductive agent in the exterior area of the electrode active material layer (which may also be referred to as "an upper-layer electrode active material"). Specifically, a weight percentage of an electrochemical active material in the interior area is lower than a weight percentage of an electrochemical active material in the exterior area.

In this application, when mentioned, "interior" of the electrode active material refers to one side of the electrode active material layer that is close to the current collector in the thickness direction; and when mentioned, "exterior" of the electrode active material refers to one side of the electrode active material layer that is away from the current collector in the thickness direction.

"The conductive agent is unevenly distributed in the thickness direction" and "the weight percentage of the conductive agent in the interior area of the electrode active material layer is higher than the weight percentage of the conductive agent in the exterior area of the electrode active material layer" may include a plurality of different embodiments. For example, the weight percentage of the conductive agent in the electrode active material layer may gradually decrease along the thickness direction from the interior area to the exterior area; or the electrode active material layer is divided into two or more areas (divided into two layers, three layers, or more layers) in the thickness direction, and a weight percentage of the conductive agent in an area closest to the current collector is higher than a weight percentage of the conductive agent in each area away from the current collector. In a specific embodiment of this application, the electrode active material layer is divided into two areas (that is, divided into two electrode active material layers) in the thickness direction, and a weight percentage of the conductive agent in a lower-layer (interior) electrode active material is higher than a weight percentage of the conductive agent in an upper-layer (exterior) electrode active material.

In a preferred embodiment of this application, the electrode active material layer is divided into two areas in the thickness direction, that is, the interior area and the exterior area, and based on a total weight of the electrode active material layer in the interior area, a weight percentage of the conductive agent in the interior area is 10% to 99%, preferably, 20% to 80%, and more specifically, 50% to 80%.

Specifically, the conductive agent in the interior area includes a two-dimensional conductive carbon material, because after the two-dimensional conductive carbon material is added, the two-dimensional conductive carbon material in the interior area of the electrode active material layer may generate "horizontal sliding" in the electrode plate compaction process, thereby implementing a buffer function, reducing destruction caused by the compaction process to the conductive layer of the current collector, and reducing a crack. Specifically, a particle diameter D50 of the two-dimensional conductive carbon material is 0.01 µm to 0.1 µm. Specifically, the two-dimensional conductive carbon material in the interior area accounts for 1 wt % to 50 wt % of the conductive agent in the interior area, and the remaining conductive agent may be another type of conductive agent and is preferably a zero-dimensional carbon material. The two-dimensional conductive carbon material and the zero-dimensional carbon material may jointly work to better improve conductivity of the entire active material layer, and in particular, the interior area.

Certainly, to better implement the buffer function, the conductive agent in the exterior area also preferably includes a two-dimensional conductive carbon material.

Because content of the conductive agent is unevenly distributed, content of the binder and the active material in the electrode active material may also change along the thickness direction.

The binder used in the electrode active material layer is selected from at least one of styrene butadiene rubber, oil-based polyvinylidene fluoride (PVDF), polyvinylidene fluoride copolymer (for example, PVDF-HFP copolymer or PVDF-TFE copolymer), sodium carboxymethyl celullose, polystyrene, polyacrylic acid, polytetrafluoroethylene, polyacrylonitrile, polyimide, water-based PVDF, polyurethane, polyvinyl alcohol, polyacrylate, polyacrylic-acid-polyacrylonitrile copolymer, and polyacrylate-polyacrylonitrile copolymer.

The binder in the interior area is preferably a water-based binder, for example, at least one of water-based PVDF, acrylic acid, polyurethane, polyvinyl alcohol, polyacrylate, polyacrylic-acid-polyacrylonitrile copolymer, and polyacrylate-polyacrylonitrile copolymer. Therefore, DCR of the electrochemical apparatus does not increase significantly. In this application, a "water-based" polymeric material means that a molecular chain of a polymer completely extends and dissolves in water; and an "oil-based" polymeric material means that a molecular chain of a polymer completely extends and dissolves in an oil-based solvent. A person skilled in the art understands that an appropriate surfactant may be used to dissolve a same type of polymeric material into water and oil separately, that is, a same type of polymeric material may be made into a water-based polymeric material and an oil-based polymeric material separately by using an appropriate surfactant. For example, a person skilled in the art may change PVDF into water-based PVDF or oil-based PVDF based on a requirement.

In addition, for the electrode plate in this application, when content of the binder in the electrode active material layer is high, there is an appropriate bonding force between the active material layer and the current collector. Therefore, in an abnormal case such as nail penetration, the active material layer can effectively wrap metal burrs generated in the conductive layer, to improve safety performance of the battery in nail penetration. However, if content of the binder is excessively high, content of the active material is reduced, and this is disadvantageous for ensuring a high electrochemical capacity of the battery. Therefore, to further improve safety of the battery and ensure the high capacity of the battery, a weight percentage of the binder in the interior area is preferably higher than a weight percentage of the binder in the exterior area.

In a preferred embodiment of this application, the electrode active material layer is divided into two areas in the thickness direction, that is, the interior area and the exterior area, and based on the total weight of the electrode active material layer in the interior area, the weight percentage of the binder in the interior area is 1% to 90%, preferably, 20% to 80%, and more specifically, 20% to 50%.

In a preferred embodiment of this application, the electrode active material layer is divided into two areas in the thickness direction, that is, the interior area and the exterior area, and based on the total weight of the electrode active material layer in the interior area, the weight percentage of the conductive agent in the interior area is 10% to 99%, preferably, 20% to 80%, and more specifically, 50% to 80%; the weight percentage of the binder in the interior area is 1% to 90%, preferably, 20% to 80%, and more specifically, 20% to 50%; and the rest is the electrode active material. However, in this embodiment, content of the electrode active material in the interior area may be 0%.

In another preferred embodiment of this application, the electrode plate is a positive electrode plate, and based on a total weight of the electrode (positive electrode) active material layer in the interior area, content of the conductive agent is preferably 10 wt % to 98 wt %, content of the binder is preferably 1 wt % to 89 wt %, and content of the electrode (positive electrode) active material is preferably 1 wt % to 89 wt %.

To further improve safety of the battery in nail penetration, preferably, content of the binder in the exterior area of the electrode active material layer (relative to a total weight of the electrode active material layer in the exterior area) is not less than 1 wt %, preferably not less than 1.5 wt %. If certain content of the binder in the exterior area is maintained, the bonding force between the entire active material layer (including the interior area and the exterior area) and the composite current collector is appropriate. Therefore, in an abnormal case such as nail penetration, the entire active material layer can effectively wrap metal burrs generated in the conductive layer, to improve safety performance of the battery in nail penetration.

In a preferred embodiment of this application, the electrode active material layer is divided into two areas in the thickness direction, that is, the interior area and the exterior area, where a thickness H (single-side thickness in a case of two-layer coating) of the interior area of the electrode active material layer is preferably 0.1 μm to 5 μm; and preferably, H/D2 is 0.5:1 to 5:1. If the ratio of H/D2 is excessively low, the crack of the conductive layer cannot be effectively improved, and conductivity of the electrode plate cannot be effectively improved. If the ratio is excessively high, not only weight energy density of the battery is reduced, but also DCR of the battery is increased, and this is disadvantageous for improving kinetic performance of the battery.

It should be noted that in the embodiment in which the electrode active material layer is divided into two areas in the thickness direction, that is, the interior area and the exterior area, electrode active materials, conductive agents, and binders used in the interior area and the exterior area may be the same or different. A conductive agent preferably including a two-dimensional conductive carbon material in this application and a water-based binder are preferably used in the interior area. A same or different conductive agent and binder may be used in the exterior area. For the positive electrode plate, the positive electrode active material in the interior area may be the same as or different from the positive electrode active material in the exterior area; and the positive electrode active material in the interior area is preferably a material with high thermal stability, for example, at least one of lithium iron phosphate, lithium manganese iron phosphate, lithium manganate, lithium manganese phosphate, NCM333, and NCM523.

The electrode active material layer in which the conductive agent is unevenly distributed in the thickness direction may be prepared by using a known method in the art, for example, by using a multi-layer coating method, for example, a two-layer coating method or a three-layer coating method. However, this application is not limited thereto.

[Electrode Plate]

FIG. 9 to FIG. 12 show schematic structural diagrams of electrode plates in some embodiments of this application.

Figure 9:
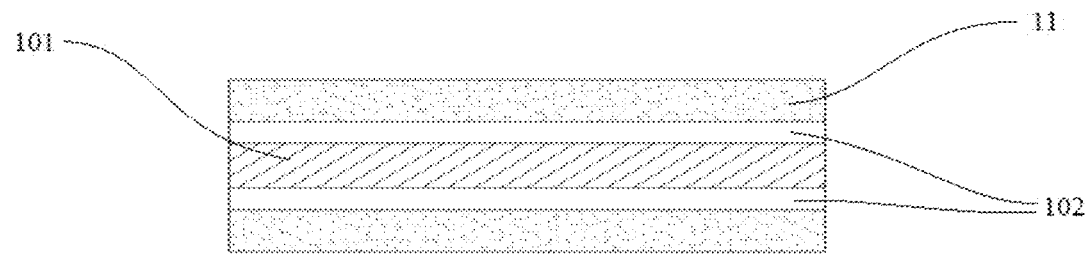
FIG. 9 is a schematic structural diagram of a positive electrode plate according to a specific embodiment of this application.
Figure 10:
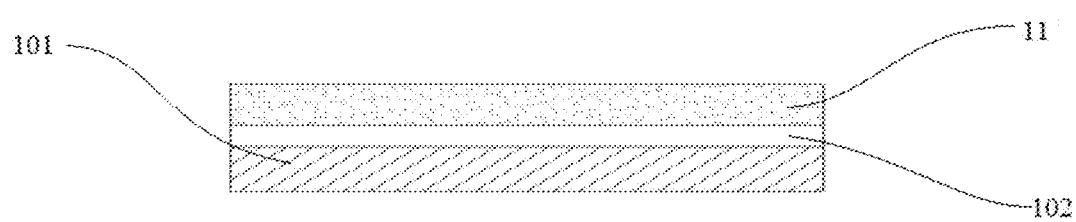
FIG. 10 is a schematic structural diagram of a positive electrode plate according to another specific embodiment of this application.

Schematic diagrams of positive electrode plates are shown in FIG. 9 and FIG. 10.

In FIG. 9, a positive electrode plate includes a positive electrode current collector 10 and positive electrode active material layers 11 that are disposed on two opposite surfaces of the positive electrode current collector 10, where the positive electrode current collector 10 includes a positive electrode current collector support layer 101, positive electrode current collector conductive layers 102 that are disposed on two opposite surfaces of the positive electrode current collector support layer 101, and a positive electrode protection layer 103 (not shown in the figure) that is disposed on one side or two sides of the positive electrode conductive layer 102.

In FIG. 10, a positive electrode plate includes a positive electrode current collector 10 and a positive electrode active material layer 11 that is disposed on one surface of the positive electrode current collector 10, where the positive electrode current collector 10 includes a positive electrode current collector support layer 101, a positive electrode current collector conductive layer 102 that is disposed on one surface of the positive electrode current collector support layer 101, and a positive electrode protection layer 103 (not shown in the figure) that is disposed on one side or two sides of the positive electrode conductive layer 102.

Figure 11:
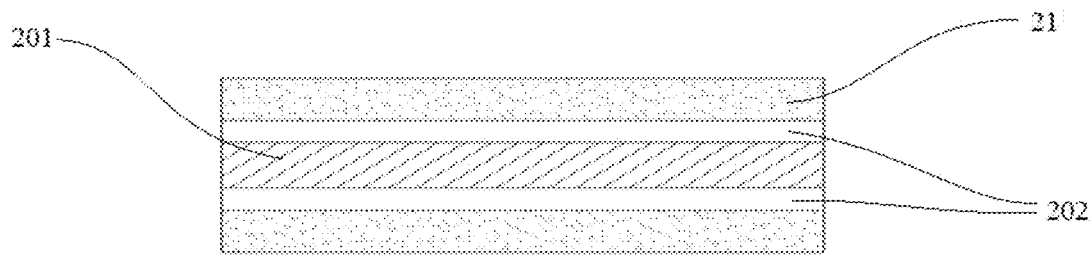
FIG. 11 is a schematic structural diagram of a negative electrode plate according to a specific embodiment of this application.
Figure 12:
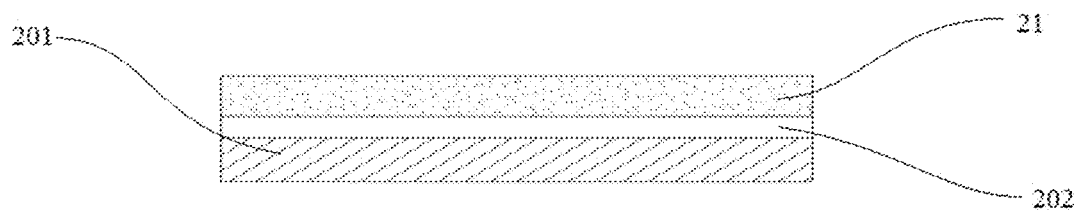
FIG. 12 is a schematic structural diagram of a negative electrode plate according to another specific embodiment of this application.

Schematic diagrams of negative electrode plates are shown in FIG. 11 and FIG. 12.

In FIG. 11, a negative electrode plate includes a negative electrode current collector 20 and negative electrode active material layers 21 that are disposed on two opposite surfaces of the negative electrode current collector 20, where the negative electrode current collector 20 includes a negative electrode current collector support layer 201, negative electrode current collector conductive layers 202 that are disposed on two opposite surfaces of the negative electrode current collector support layer 201, and a negative electrode protection layer 203 (not shown in the figure) that is disposed on one side or two sides of the negative electrode conductive layer 202.

In FIG. 12, a negative electrode plate includes a negative electrode current collector 20 and a negative electrode active material layer 21 that is disposed on one surface of the negative electrode current collector 20, where the negative electrode current collector 20 includes a negative electrode current collector support layer 201, a negative electrode current collector conductive layer 202 that is disposed on one surface of the negative electrode current collector support layer 201, and a negative electrode protection layer 203 (not shown in the figure) that is disposed on one side or two sides of the negative electrode conductive layer 202.

As shown in FIG. 9 to FIG. 12, an electrode active material layer may be disposed on one surface of a current collector, or may be disposed on two surfaces of a current collector.

A person skilled in the art may understand that when a current collector provided with conductive layers on both sides is used, both sides of an electrode plate may be coated (that is, electrode active material layers are disposed on two surfaces of the current collector), or a single side of the electrode plate may be coated (that is, an electrode active material layer is disposed on only one surface of the current collector); when a current collector provided with a conductive layer only on a single side is used, only a single side of an electrode plate can be coated, and only the side of the current collector on which the conductive layer is disposed can be coated with an electrode active material layer.

[Electrochemical Apparatus]

A second aspect of this application relates to an electrochemical apparatus, including a positive electrode plate, a negative electrode plate, a separator, and an electrolyte, where the positive electrode plate and/or the negative electrode plate are/or the electrode plate according to the first aspect of this application.

The electrochemical apparatus may be a capacitor, a primary battery, or a secondary battery. For example, the electrochemical apparatus may be a lithium-ion capacitor, a lithium-ion primary battery, or a lithium-ion secondary battery. A method for constructing and preparing the electrochemical apparatus is well known, except that a positive electrode plate and/or a negative electrode plate in this application are/is used. Because the electrode plate in this application is used, the electrochemical apparatus has improved safety (for example, safety in nail penetration) and electrical performance. In addition, because the electrode plate in this application can be easily machined, manufacturing costs of the electrochemical apparatus using the electrode plate in this application can be reduced.

In the electrochemical apparatus in this application, specific types and composition of the separator and the electrolyte are not specifically limited, and may be selected based on an actual requirement. Specifically, the separator may be selected from a polyethylene film, a polypropylene film, a polyvinylidene fluoride film, and a multi-layer composite film thereof. When the battery is a lithium-ion battery, a non-aqueous electrolyte is generally used as its electrolyte. As a non-aqueous electrolyte, a lithium salt solution dissolved in an organic solvent is generally used. For example, lithium salt is inorganic lithium salt such as $LiC_1O_4$, $LiPF_6$, $LiBF_4$, $LiAsF_6$, or $LiSbF_6$, or organic lithium salt such as $LiCF_3SO_3$, $LiCF_3CO_2$, $Li_2C_2F_4 (SO_3)_2$, $LiN (CF_3SO_2)_2$, $LiC (CF_3SO_2)_3$, or $LiCnF_{2n+1}SO_3$ (n≥2). For example, the organic solvent used for the non-aqueous electrolyte is cyclic carbonate such as ethylene carbonate, propylene carbonate, butylene carbonate, or vinylene carbonate, or chain carbonate such as dimethyl carbonate, diethyl carbonate, or ethyl methyl carbonate, or chain ester such as methyl propionate, or cyclic ester such as γ-butyrolactone, or chain ether such as dimethoxyethane, diethyl ether, diethylene glycol dimethyl ether, or triethylene glycol dimethyl ether, or cyclic ether such as tetrahydrofuran or 2-methyltetrahydrofuran, or nitrile such as acetonitrile or propionitrile, or a mixture of these solvents.

[Battery Module]

A third aspect of this application relates to a battery module, including any electrochemical apparatus or several electrochemical apparatuses in the second aspect of this application.

Further, a quantity of electrochemical apparatuses included in the battery module may be adjusted based on an application and a capacity of the battery module.

Figure 14:
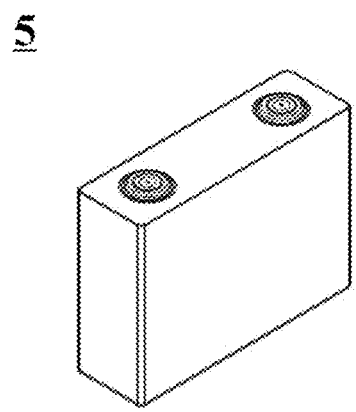
FIG. 14 is a schematic structural diagram of an electrochemical apparatus according to a specific embodiment of this application.
Figure 15:
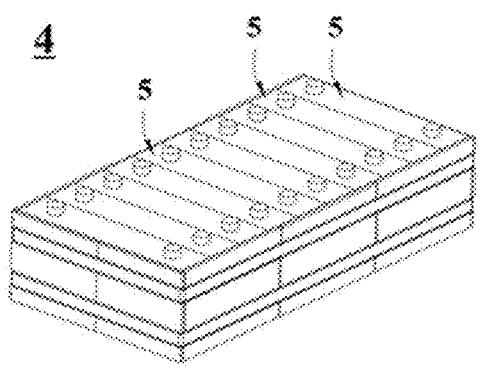
FIG. 15 is a schematic structural diagram of a battery module according to a specific embodiment of this application.

In some embodiments, referring to FIG. 14 and FIG. 15, a plurality of electrochemical apparatuses 5 in a battery module 4 are arranged in sequence along a length direction of the battery module 4. Certainly, an arrangement may be made in any other manner. Further, the plurality of electrochemical apparatuses 5 may be fixed by using fasteners.

Optionally, the battery module 4 may further include a housing that has an accommodating space, and the plurality of electrochemical apparatuses 5 are accommodated in the accommodating space.

[Battery Pack]

A fourth aspect of this application relates to a battery pack, including any battery module or several battery modules in the third aspect of this application. To be specific, the battery pack includes any electrochemical apparatus or several electrochemical apparatuses in the second aspect of this application.

A quantity of battery modules in the battery pack may be adjusted based on an application and a capacity of the battery pack.

Figure 16:
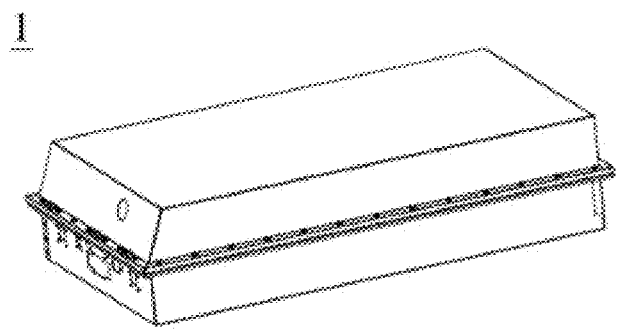
FIG. 16 is a schematic structural diagram of a battery pack according to a specific embodiment of this application.
Figure 17:
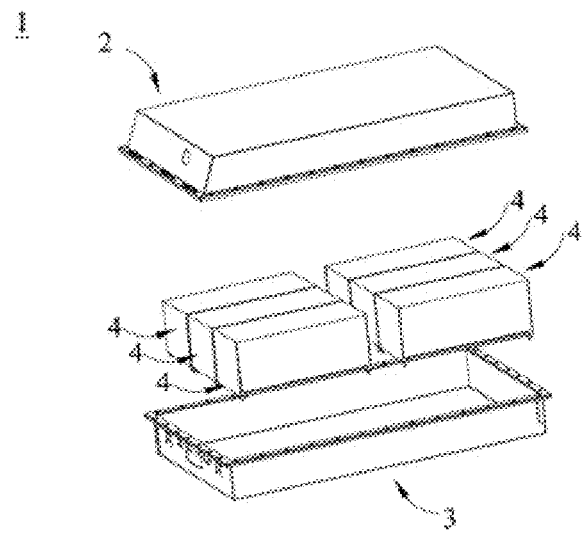
FIG. 17 is an exploded view of FIG. 16.

In some embodiments, referring to FIG. 16 and FIG. 17, a battery pack 1 may include a battery box and a plurality of battery modules 4 disposed in the battery box. The battery box includes an upper case 2 and a lower case 3. The upper case 2 can cover the lower case 3 to form a closed space for accommodating the battery modules 4. The plurality of battery modules 4 may be arranged in the battery box in any manner.

[Device]

A fifth aspect of this application relates to a device, including any electrochemical apparatus or several electrochemical apparatuses in the second aspect of this application. The electrochemical apparatus may be used as a power supply for the device.

Specifically, the device may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, or the like.

Figure 18:
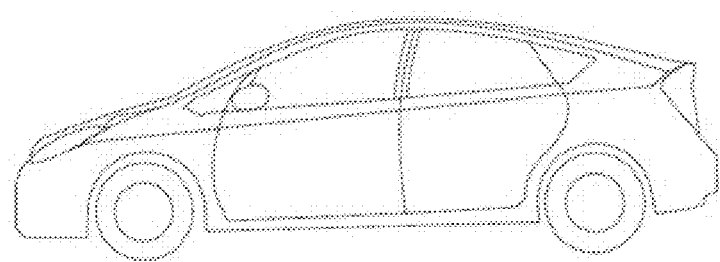
FIG. 18 is a schematic diagram of an embodiment of a device using an electrochemical apparatus as a power supply.

For example, FIG. 18 shows a device including an electrochemical apparatus in this application. The device is a full electric vehicle, a hybrid electric vehicle, a plug-in hybrid electric vehicle, or the like, and the electrochemical apparatus in this application supplies power to the device.

Because the electrochemical apparatus provided in this application is included, the battery module, battery pack, and device have at least the same advantages as the electrochemical apparatus. Details are not described again herein.

A person skilled in the art may understand that the foregoing definitions or preferred ranges of component selection, component content, and material physicochemical performance parameters in electrochemical active materials in different embodiments of this application may be randomly combined, and various embodiments obtained through the combination shall still fall within the scope of this application and shall be considered as a part of content disclosed in this specification.

Unless otherwise specified, various parameters in this specification have general meanings well known in the art, and may be measured by using a method well known in the art. For example, a test may be performed according to a method provided in an embodiment of this application. In addition, preferred ranges and options of different parameters provided in various preferred embodiments may be randomly combined, and it is considered that various combinations obtained thereby shall fall within the disclosed scope of this application.

The following further describes beneficial effects of this application with reference to embodiments.

Embodiments

1. Preparing a current collector that does not have a protection layer:

A support layer with a certain thickness is selected, and a conductive layer with a certain thickness is formed on a surface of the support layer by vacuum evaporating, mechanical rolling, or bonding.

(1) A formation condition for vacuum evaporating is as follows: A support layer that undergoes surface cleaning processing is placed in a vacuum plating chamber; a high-purity metal wire in a metal evaporating chamber is melted and evaporated at a high temperature of 1600° C. to 2000° C.; and the evaporated metal passes through a cooling system in the vacuum plating chamber and is finally deposited on a surface of the support layer to form a conductive layer.

(2) A formation condition for mechanical rolling is as follows: A foil of a conductive layer material is placed in a mechanical roller; a pressure of 20 t to 40 t is applied to the foil to roll the foil to a predetermined thickness; then the foil is placed on a surface of a support layer that undergoes surface cleaning processing; and finally, the two are placed in the mechanical roller, and a pressure of 30 t to 50 t is applied, so that the two are tightly bonded.

(3) A formation condition for bonding: A foil of a conductive layer material is placed in a mechanical roller; a pressure of 20 t to 40 t is applied to the foil to roll the foil to a predetermined thickness; then a surface of a support layer that undergoes surface cleaning processing is coated with a mixed solution of PVDF and NMP; and finally, a conductive layer with the predetermined thickness is bonded to the surface of the support layer and dried at 100° C.

2. Preparing a current collector that has a protection layer:

A current collector that has a protection layer is prepared in the following manners:

(1) First, a protection layer is disposed on a surface of a support layer by using a vapor deposition method or a coating method; then a conductive layer with a certain thickness is formed by vacuum evaporating, mechanical rolling, or bonding, on the surface of the support layer having the protection layer, to prepare a current collector that has a protection layer (the protection layer is located between the support layer and the conductive layer); in addition, on the foregoing basis, another protection layer may be formed on a surface of the conductive layer in a direction away from the support layer by using the vapor deposition method, an in-situ formation method, or the coating method, to prepare the current collector with protection layers (the protection layers are located on two opposite surfaces of the conductive layer).

(2) First, a protection layer is formed on a surface of a conductive layer by using a vapor deposition method, an in-situ formation method, or a coating method; then the conductive layer having the protection layer is disposed on a surface of a support layer by mechanical rolling or bonding, and the protection layer is disposed between the support layer and the conductive layer, to prepare a current collector having a protection layer (the protection layer is located between the support layer and the conductive layer); in addition, on the foregoing basis, another protection layer may be formed on a surface of the conductive layer in a direction away from the support layer by using the vapor deposition method, the in-situ formation method, or the coating method, to prepare the current collector with protection layers (the protection layers are located on two opposite surfaces of the conductive layer).

(3) First, a protection layer is formed on a surface of a conductive layer by using a vapor deposition method, an in-situ formation method, or a coating method; then the conductive layer having the protection layer is disposed on a surface of a support layer by mechanical rolling or bonding, and the protection layer is disposed on the surface of the conductive layer away from the support layer, to prepare a current collector having a protection layer (the protection layer is located on the surface of the conductive layer away from the support layer).

(4) First, protection layers are formed on two surfaces of a conductive layer by using a vapor deposition method, an in-situ formation method, or a coating method; and then the conductive layer having the protection layers is disposed on a surface of a support layer by mechanical rolling or bonding, to prepare a current collector having protection layers (the protection layers are located on two opposite surfaces of the conductive layer).

(5) On a basis of "preparing a current collector that does not have a protection layer" above, another protection layer is formed on a surface of a conductive layer in a direction away from a support layer by using a vapor deposition method, an in-situ formation method, or a coating method, to prepare a current collector having a protection layer (the protection layer is located on the surface of the conductive layer away from the support layer).

In a preparation example, the vapor deposition method uses vacuum evaporating, the in-situ formation method uses in-situ passivating, and the coating method uses blade coating.

A formation condition for vacuum evaporating is as follows: A sample that undergoes surface cleaning processing is placed in a vacuum plating chamber; a protection layer material in an evaporating chamber is melted and evaporated at a high temperature of 1600° C. to 2000° C.; and the evaporated protection layer material passes through a cooling system in the vacuum plating chamber and is finally deposited on a surface of the sample to form a protection layer.

A formation condition for in-situ passivating is as follows: A conductive layer is placed in a high-temperature oxidizing environment, where a temperature is controlled to be 160° C. to 250° C., oxygen supplying in the high-temperature environment is maintained, and processing time is 30 min, so that a metal oxide protection layer is formed.

A formation condition for gravure coating is as follows: A protection layer material and NMP are stirred and mixed; then a sample surface is coated with a slurry of the protection layer material (solid content is 20% to 75%); then a thickness of the coating is controlled by using a gravure roller; and finally, the coating is dried at a temperature of 100° C. to 130° C.

3. Preparing an Electrode Plate:

(1) Positive Electrode Plate in an Embodiment:

A positive electrode plate that has a lower positive electrode active material layer (interior area) and an upper positive electrode active material layer (exterior area) is coated by using a two-layer coating method.

A conductive agent (such as conductive carbon black), a binder (such as PVDF or polyacrylic acid), and an optional positive electrode active material that are proportioned are dissolved in an appropriate solvent (for example, NMP or water), and stirred evenly to prepare a primer slurry.

Two surfaces of a composite current collector prepared according to the foregoing method are evenly coated with the primer slurry at a coating speed of 20 m/min, and a primer layer is dried, where an oven temperature is 70° C. to 100° C., and drying time is 5 min.

After the primer layer is completely dried, 92 wt % positive electrode active material, 5 wt % conductive agent Super-P ("SP" for short), and 3 wt % PVDF are dissolved in an NMP solvent, and evenly stirred to prepare an upper layer slurry; a dry surface of the primer layer is coated with the upper layer slurry by extrusion coating; and after the coating is dried at 85° C., a positive electrode active material layer is obtained.

Then the current collector having various coating layers is cold-pressed and cut, and dried for four hours under an 85° C. vacuum condition, and a tab is welded, so that a positive electrode plate is obtained.

(2) Comparative Positive Electrode Plate:

It is prepared by using a method similar to the method for preparing a positive electrode plate in the foregoing embodiment. However, an upper layer slurry is directly applied to a surface of a composite current collector, and no lower positive electrode active material layer (primer layer) is disposed.

(3) Conventional Positive Electrode Plate:

A current collector is an Al foil with a thickness of 12 μm. By using a method similar to the foregoing method for preparing a comparative positive electrode plate, an upper layer slurry is directly applied to a surface of the Al foil current collector, and after processing, a conventional positive electrode plate is obtained.

(4) Negative Electrode Plate in an Embodiment:

A negative electrode plate that has a lower negative electrode active material layer (interior area) and an upper negative electrode active material layer (exterior area) is coated by using a two-layer coating method.

A conductive agent (such as conductive carbon black), a binder (such as PVDF or polyacrylic acid), and an optional negative electrode active material that are proportioned are dissolved in an appropriate solvent (for example, NMP or water), and stirred evenly to prepare a primer slurry.

Two surfaces of a composite current collector prepared according to the foregoing method are evenly coated with the primer slurry at a coating speed of 20 m/min, and a primer layer is dried, where an oven temperature is 70° C. to 100° C., and drying time is 5 min.

After the primer layer is completely dried, a negative electrode active substance artificial graphite, a conductive agent Super-P, a thickening agent CMC, and a binder SBR are added based on a mass ratio of 96.5:1.0:1.0:1.5 to a deionized water solvent, and mixed evenly to prepare an upper layer slurry; a surface of the primer layer is coated with the upper layer slurry by extrusion coating; and after the coating is dried at 85° C., a negative electrode active material layer is obtained.

Then the current collector having various coating layers is cold-pressed and cut, and dried for four hours under a 110° C. vacuum condition, and a tab is welded, so that a negative electrode plate is obtained.

(5) Comparative Negative Electrode Plate:

It is prepared by using a method similar to the method for preparing a negative electrode plate in the foregoing embodiment. However, an upper-layer slurry is directly applied to a surface of a composite current collector, and no lower negative electrode active material layer (primer layer) is disposed.

(6) Conventional Negative Electrode Plate:

A current collector is a Cu foil with a thickness of 8 μm. By using a method similar to the foregoing method for preparing a comparative negative electrode plate, an upper-layer slurry is directly applied to a surface of the Cu foil current collector, and after processing, a conventional negative electrode plate is obtained.

4. Preparing a Battery:

Through a conventional battery preparation process, a positive electrode plate (compacted density: 3.4 g/cm$^3$), a PP/PE/PP separator, and a negative electrode plate (compacted density: 1.6 g/cm$^3$) are wound together into a bare cell, and then placed in a battery housing; an electrolyte (EC-EMC volume ratio: 3:7; LiPF$_6$: 1 mol/L) is injected; then after processes such as sealing and formation, a lithium-ion secondary battery (hereinafter referred to as the battery for short) is finally obtained.

5. Battery Testing Method:

(1) Method for Testing Cycle Life of a Lithium-Ion Battery:

The lithium-ion battery is charged and discharged at 45° C., that is, first charged to 4.2 V by using a 1 C current, and then discharged to 2.8 V by using a 1 C current, and a discharge capacity in a first cycle is recorded; then the battery is charged and discharged for 1000 cycles by using 1 C/1 C currents, and a discharge capacity in the 1000$^{th}$ cycle is recorded; the discharge capacity in the 1000$^{th}$ cycle is divided by the discharge capacity in the first cycle, and a capacity retention rate in the 1000$^{th}$ cycle is obtained.

(2) Method for Testing a DCR Growth Rate:

At 25° C., a secondary battery is adjusted to 50% SOC by using a 1 C current, and a voltage U1 is recorded. Then the battery is discharged for 30 s by using a 4 C current, and a voltage U2 is recorded. DCR=(U1−U2)/4 C. Then the battery is charged and discharged for 500 cycles by using 1 C/1 C currents, and DCR in the 500$^{th}$ cycle is recorded. The DCR in the 500$^{th}$ cycle is divided by the DCR in the first cycle, then 1 is subtracted, and a DCR growth rate in the 500$^{th}$ cycle is obtained.

(3) Pin Penetration Test:

A secondary battery (10 samples) is fully charged to a charging cut-off voltage by using a 1 C current, and then constant-voltage charging is performed until the current is reduced to 0.05 C. Then charging is stopped. The battery is penetrated at a speed of 25 mm/s in a direction vertical to a battery plate by using a φ8 mm heat-resistant steel pin, where a penetration position is preferably close to a geometric center in a penetrated surface, and the steel pin stays in the battery. Whether a phenomenon of battery burning or explosion occurs is observed.

6. Test Result and Discussion:

6.1. Function of a Composite Current Collector in Improving Weight Energy Density of a Battery Specific parameters of current collectors and electrode plates thereof in various embodiments are shown in Table 1 (no protection layer is disposed in the current collectors in the embodiments that are listed in Table 1). In Table 1, for a positive electrode current collector, a weight percentage of the current collector is the percentage of a weight of the positive electrode current collector in a unit area in a weight of a conventional positive electrode current collector in a unit area; and for a negative electrode current collector, a weight percentage of the current collector is the percentage of a weight of the negative electrode current collector in a unit area in a weight of a conventional negative electrode current collector in a unit area.

TABLE 1

| Electrode plate No. | Current collector No. | Support layer Material | D1 | Conductive layer Material | D2 | Thickness of the current collector | Weight percentage of the current collector |
|---|---|---|---|---|---|---|---|
| Positive electrode plate 1 | Positive electrode current collector 1 | PI | 6 μm | Al | 300 nm | 6.6 μm | 30.0% |
| Positive electrode plate 2 | Positive electrode current collector 2 | PET | 4 μm | Al | 500 nm | 5 μm | 24.3% |
| Positive electrode plate 3 | Positive electrode current collector 3 | PET | 2 μm | Al | 200 nm | 2.4 μm | 11.3% |
| Conventional positive electrode plate | Conventional positive electrode current collector | / | / | Al | / | 12 μm | 100% |
| Negative electrode plate 1 | Negative electrode current collector 1 | PET | 5 μm | Cu | 500 nm | 6 μm | 21.6% |
| Negative electrode plate 2 | Negative electrode current collector 2 | PI | 2 μm | Cu | 800 nm | 3.6 μm | 23.8% |
| Negative electrode plate 3 | Negative electrode current collector 3 | PET | 8 μm | Cu | 1 μm | 10 μm | 39.6% |
| Negative electrode plate 4 | Negative electrode current collector 4 | PET | 6 μm | Cu | 1.5 μm | 9 μm | 48.5% |
| Negative electrode plate 5 | Negative electrode current collector 5 | PET | 4 μm | Cu | 1.2 μm | 6.4 μm | 37.3% |
| Negative electrode plate 6 | Negative electrode current collector 6 | PET | 10 μm | Cu | 200 nm | 10.4 μm | 23.3% |
| Negative electrode plate 7 | Negative electrode current collector 7 | PI | 8 μm | Cu | 2 μm | 12 μm | 65.3% |
| Conventional negative electrode plate | Conventional negative electrode current collector | / | / | Cu | / | 8 μm | 100% |

Based on Table 1, it can be known that weights of both a positive electrode current collector and a negative electrode current collector in this application are reduced to different extents in comparison with a conventional current collector, so that weight energy density of a battery can be increased. However, for a current collector, and in particular, for a negative electrode current collector, when a thickness of a conductive layer is greater than 1.5 μm, an extent of weight reduction improved is reduced.

6.2. Function of a Protection Layer in Improving Electrochemical Performance of a Composite Current Collector On a basis of the current collectors in the embodiments that are listed in Table 1, protection layers are further formed, to facilitate research on functions of the protection layers in improving electrochemical performance of composite current collectors. "Positive electrode current collector 2-1" in Table 2 represents a current collector whose protection layers are formed based on "positive electrode current collector 2" in Table 1. Meanings of numbers of other current collectors are similar to this.

TABLE 2

| Electrode plate No. | Current collector No. | Upper protection layer Material | D3' | Lower protection layer Material | D3'' |
|---|---|---|---|---|---|
| Positive electrode plate 2-1 | Positive electrode current collector 2-1 | Nickel oxide | 10 nm | Nickel oxide | 8 nm |
| Positive electrode plate 2-2 | Positive electrode current collector 2-2 | Nickel oxide | 50 nm | Nickel oxide | 30 nm |
| Negative electrode plate 4-1 | Negative electrode current collector 4-1 | / | / | Nickel | 200 nm |
| Negative electrode plate 4-2 | Negative electrode current collector 4-2 | Nickel | 5 nm | / | / |
| Negative electrode plate 4-3 | Negative electrode current collector 4-3 | Nickel-based alloy | 100 nm | / | / |
| Negative electrode plate 4-4 | Negative electrode current collector 4-4 | Nickel | 10 nm | Nickel | 10 nm |
| Negative electrode plate 4-5 | Negative electrode current collector 4-5 | Nickel | 50 nm | Nickel | 50 nm |
| Negative electrode plate 4-6 | Negative electrode current collector 4-6 | Nickel | 100 nm | Nickel | 50 nm |

Table 3 shows cycle performance data obtained through measurement after the electrode plates listed in Table 2 are assembled into batteries.

TABLE 3

| Battery No. | Electrode plate | | Capacity retention rate in a 1000$^{th}$ cycle at 45° C. |
|---|---|---|---|
| Battery 1 | Conventional negative electrode plate | Conventional positive electrode plate | 86.5% |
| Battery 2 | Conventional negative electrode plate | Positive electrode plate 2 | 80.7% |
| Battery 3 | Conventional negative electrode plate | Positive electrode plate 2-1 | 85.2% |
| Battery 4 | Conventional negative electrode plate | Positive electrode plate 2-2 | 85.4% |
| Battery 5 | Negative electrode plate 4 | Conventional positive electrode plate | 86.3% |
| Battery 6 | Negative electrode plate 4-1 | Conventional positive electrode plate | 87.1% |
| Battery 7 | Negative electrode plate 4-2 | Conventional positive electrode plate | 86.5% |
| Battery 8 | Negative electrode plate 4-3 | Conventional positive electrode plate | 86.7% |
| Battery 9 | Negative electrode plate 4-4 | Conventional positive electrode plate | 87.6% |
| Battery 10 | Negative electrode plate 4-5 | Conventional positive electrode plate | 87.8% |
| Battery 11 | Negative electrode plate 4-6 | Conventional positive electrode plate | 88.0% |

As shown in Table 3, in comparison with a battery 1 using a conventional positive electrode plate and a conventional negative electrode plate, a battery using a current collector according to an embodiment of this application has good cycle life, and its cycle performance is equivalent to that of a conventional battery. In particular, for a battery made of a current collector including a protection layer, in comparison with a battery made of a current collector not including a protection layer, a capacity retention rate of the battery may be further increased, which indicates that reliability of the battery is higher.

6.3. Function of a Primer Layer (Interior Area) in Improving Electrochemical Performance of a Battery In an embodiment, a two-layer coating method is used to form an electrode active material layer on a current collector to form an electrode plate. Therefore, the electrode active material layer is divided into two parts: an interior area (which may be referred to as "a lower electrode active material layer) and an exterior area (which may be referred to as "an upper electrode active material layer". Because content of a conductive agent in the lower active material layer is higher than content of a conductive agent in the upper active material layer, the lower electrode active material layer may also be referred to as a conductive primer layer (or primer layer for short).

The following uses a positive electrode plate as an example to describe functions of factors such as the primer layer and composition of the primer layer in improving electrochemical performance of a battery. Table 4 shows specific composition and related parameters of batteries and electrode plates and current collectors that are used in the batteries in various embodiments and comparative examples. Table 5 shows a performance measurement result of each battery.

TABLE 4

| Electrode plate No. | Current collector No. | Support layer | | Conductive layer | | Primer layer (interior area) | Upper active material layer (exterior area) |
|---|---|---|---|---|---|---|---|
| | | Material | D1 | Material | D2 | | |
| Comparative positive electrode plate 20 | Positive electrode current collector 4 | PET | 10 μm | Al | 1 μm | / | NCM333, 9.8 μm D50, and 55 μm active material layer thickness |
| Positive electrode plate 21 | Positive electrode current collector 4 | PET | 10 μm | Al | 1 μm | 10% conductive carbon black, 90% water-based polyacrylic acid, and 1.5 μm thickness | Same as above |
| Positive electrode plate 22 | Positive electrode current collector 4 | PET | 10 μm | Al | 1 μm | 20% conductive carbon black, 80% water-based polyacrylic acid, and 1.5 μm thickness | Same as above |
| Positive electrode plate 23 | Positive electrode current collector 4 | PET | 10 μm | Al | 1 μm | 50% conductive carbon black, 50% water-based PVDF, and 1.5 μm thickness | Same as above |
| Positive electrode plate 24 | Positive electrode current collector 4 | PET | 10 μm | Al | 1 μm | 65% conductive carbon black, 35% water-based PVDF, and 1.5 μm thickness | Same as above |

TABLE 4-continued

| Electrode plate No. | Current collector No. | Support layer Material | D1 | Conductive layer Material | D2 | Primer layer (interior area) | Upper active material layer (exterior area) |
|---|---|---|---|---|---|---|---|
| Positive electrode plate 25 | Positive electrode current collector 4 | PET | 10 μm | Al | 1 μm | 80% conductive carbon black, 20% water-based PVDF, and 1.5 μm thickness | Same as above |
| Positive electrode plate 26 | Positive electrode current collector 4 | PET | 10 μm | Al | 1 μm | 99% conductive carbon black, 1% water-based PVDF, and 1.5 μm thickness | Same as above |
| Positive electrode plate 27 | Positive electrode current collector 4 | PET | 10 μm | Al | 1 μm | 65% conductive carbon black, 35% oil-based PVDF, and 1.5 μm thickness | Same as above |
| Positive electrode plate 28 | Positive electrode current collector 4 | PET | 10 μm | Al | 1 μm | 80% conductive carbon black, 20% oil-based PVDF, and 1.5 μm thickness | Same as above |
| Positive electrode plate 29 | Positive electrode current collector 4 | PET | 10 μm | Al | 1 μm | 32.5% conductive carbon black, 32.5% flake conductive graphite (0.05 μm D50), 35% water-based PVDF, and 1.5 μm thickness | Same as above |
| Positive electrode plate 30 | Positive electrode current collector 4 | PET | 10 μm | Al | 1 μm | 65% conductive carbon black, 35% water-based PVDF, and 500 nm thickness | Same as above |
| Positive electrode plate 31 | Positive electrode current collector 4 | PET | 10 μm | Al | 1 μm | 65% conductive carbon black, 35% water-based PVDF, and 2 μm thickness | Same as above |
| Positive electrode plate 32 | Positive electrode current collector 4 | PET | 10 μm | Al | 1 μm | 65% conductive carbon black, 35% water-based PVDF, and 5 μm thickness | Same as above |

TABLE 5

| Battery No. | Electrode plate | | DCR growth rate |
|---|---|---|---|
| Battery 20 | Comparative positive electrode plate 20 | Conventional negative electrode plate | 35% |
| Battery 21 | Positive electrode plate 21 | Conventional negative electrode plate | 30.9% |
| Battery 22 | Positive electrode plate 22 | Conventional negative electrode plate | 29% |
| Battery 23 | Positive electrode plate 23 | Conventional negative electrode plate | 20% |
| Battery 24 | Positive electrode plate 24 | Conventional negative electrode plate | 15% |
| Battery 25 | Positive electrode plate 25 | Conventional negative electrode plate | 14.5% |
| Battery 26 | Positive electrode plate 26 | Conventional negative electrode plate | 14% |
| Battery 27 | Positive electrode plate 27 | Conventional negative electrode plate | 18.5% |
| Battery 28 | Positive electrode plate 28 | Conventional negative electrode plate | 18.2% |
| Battery 29 | Positive electrode plate 29 | Conventional negative electrode plate | 12.9% |
| Battery 30 | Positive electrode plate 30 | Conventional negative electrode plate | 15.5% |
| Battery 31 | Positive electrode plate 31 | Conventional negative electrode plate | 14.6% |
| Battery 32 | Positive electrode plate 32 | Conventional negative electrode plate | 14.1% |

The following can be seen from the foregoing test data:
1. When a composite current collector with a thin conductive layer (that is, a comparative positive electrode plate 20 not including a conductive primer layer because the two-layer coating method is not used for coating), because the composite current collector has disadvantages, for example, it has poorer conductivity than a conventional metal current collector and the conductive layer of the composite current collector may be easily damaged, there is great DCR in a battery and a cycle capacity retention rate is low. After a conductive primer layer is introduced by using the two-layer coating method, the conductive primer layer effectively repairs and establishes a conductive network between the current collector, the conductive primer layer, and an active substance to improve electronic transmission efficiency and reduce resistance between the current collector and an electrode active material layer, so that the DCR can be effectively reduced.

thickness of the conductive primer layer is disadvantageous for improving energy density of the battery.

6.4. Impact of an Electrode Active Material in a Primer Layer

In the foregoing embodiment, for ease of research, no electrode active material is added to the primer layers. The following uses a positive electrode plate as an example to test an impact of introduction of a positive electrode active material in a primer layer on performance of a battery. Refer to Table 6 and Table 7 for specific composition of electrode plates and composition of batteries.

TABLE 6

| Electrode plate No. | Current collector No. | Support layer Material | D1 | Conductive layer Material | D2 | Primer layer (interior area) | Upper active material layer (exterior area) |
|---|---|---|---|---|---|---|---|
| Comparative positive electrode plate 20 | Positive electrode current collector 4 | PET | 10 μm | Al | 1 μm | / | NCM333, 9.8 μm D50, and 55 μm active material layer thickness |
| Positive electrode plate 37 | Positive electrode current collector 4 | PET | 10 μm | Al | 1 μm | 80% conductive carbon black, 15% water-based polyacrylic acid, 5% NCM333, and 1.5 μm thickness | Same as above |
| Positive electrode plate 38 | Positive electrode current collector 4 | PET | 10 μm | Al | 1 μm | 60% conductive carbon black, 20% water-based polyacrylic acid, 20% NCM333, and 1.5 μm thickness | Same as above |
| Positive electrode plate 39 | Positive electrode current collector 4 | PET | 10 μm | Al | 1 μm | 30% conductive carbon black, 20% water-based polyacrylic acid, 50% NCM333, and 1.5 μm thickness | Same as above |
| Positive electrode plate 40 | Positive electrode current collector 4 | PET | 10 μm | Al | 1 μm | 30% conductive carbon black, 20% water-based polyacrylic acid, 50% LFP, and 1.5 μm thickness | Same as above |

2. As content of a conductive agent in the conductive primer layer is increased (positive electrode plates 21 to 26), the DCR of the battery can be improved to a greater extent.
3. Given same composition, introduction of a water-based binder can improve the DCR more apparently than an oil-based binder (positive electrode plate 24 vs. positive electrode plate 27, and positive electrode plate 25 vs. positive electrode plate 28).
4. Because flake graphite may implement a buffer function, reduce damage to the conductive layer of the current collector in a compaction process, and reduce a crack by generating "horizontal sliding", introduction of the flake graphite can further reduce the DCR of the battery (positive electrode plate 24 vs. positive electrode plate 29).
5. As a thickness of the conductive primer layer is increased (positive electrode plate 30 to positive electrode plate 32), the DCR of the battery can also be improved apparently. However, an excessively great

TABLE 7

| Battery No. | Electrode plate | | DCR growth rate |
|---|---|---|---|
| Battery 20 | Comparative positive electrode plate 20 | Conventional negative electrode plate | 35% |
| Battery 37 | Positive electrode plate 37 | Conventional negative electrode plate | 14.2% |
| Battery 38 | Positive electrode plate 38 | Conventional negative electrode plate | 14.9% |
| Battery 39 | Positive electrode plate 39 | Conventional negative electrode plate | 15.8% |
| Battery 40 | Positive electrode plate 40 | Conventional negative electrode plate | 16.5% |

From the foregoing test data, it can be seen that regardless of whether a primer layer includes an electrode active material, introduction of the primer layer can effectively repair and establish a conductive network between a current collector, a conductive primer layer, and an active substance to improve electronic transmission efficiency and reduce resistance between the current collector and an electrode active material layer, so that DCR can be effectively reduced.

6.5. Function of Content of a Binder in an Electrode Active Material Layer in Improving Electrochemical Performance of a Battery Because content of a binder in a primer layer in an interior area is generally high, there is a strong bonding force between the primer layer and a current collector. However, a bonding force between an upper electrode active material layer and the primer layer is affected by content of a binder in the upper active material layer. The content of the binder in the upper active material layer (exterior area) should be preferably higher than a lower limit value, so that in an abnormal case such as nail penetration, the entire electrode active material layer can effectively wrap metal burrs generated in the conductive layer, to improve safety performance of the battery in nail penetration.

From a perspective of safety of the battery in nail penetration, the following uses a positive electrode plate as an example to describe a function of the content of the binder in the upper electrode active material layer in improving electrochemical performance of the battery.

Positive electrode plates are prepared according to the method in the foregoing embodiment, but composition of upper-layer slurries is adjusted. In this way, a plurality of positive electrode plates with different content of binders in upper positive electrode active material layers are prepared. Refer to the following tables for specific composition of electrode plates.

TABLE 9

| Battery No. | Electrode plate | | Nail penetration test result |
|---|---|---|---|
| Battery 33 | Positive electrode plate 33 | Conventional negative electrode plate | 1 passed and 9 failed |
| Battery 34 | Positive electrode plate 34 | Conventional negative electrode plate | 6 passed and 4 failed |
| Battery 35 | Positive electrode plate 35 | Conventional negative electrode plate | All passed |
| Battery 36 | Positive electrode plate 36 | Conventional negative electrode plate | All passed |

Table 9 shows nail penetration test results when the foregoing different positive electrode plates are assembled into batteries. The results indicate that when content of a binder in an upper positive electrode active material layer is higher, safety performance of a corresponding battery in nail penetration is higher. Specifically, based on a total weight of the upper positive electrode active material layer, the content of the binder in the upper positive electrode active material layer is not less than 1 wt %, and more specifically, not less than 1.5 wt %.

6.6. Surface Morphology of a Composite Current Collector

Figure 13:
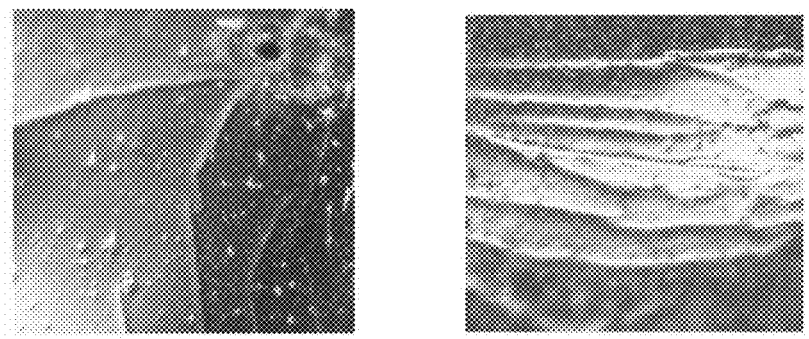
FIG. 13 is a microscopic observation diagram of a surface of a positive electrode current collector according to a specific embodiment of this application.

In a process of preparing a positive electrode plate 24, after cold pressing, a small sample is taken, and a surface of the positive electrode plate 24 is cleaned by using a piece of dust-free paper dipped in a DMC solvent, so that a surface of a composite current collector can be exposed. Then a surface morphology is observed by using a CCD microscope instrument. Refer to FIG. 13 for an observation diagram of the surface morphology. An obvious crack can be seen from FIG. 13. The crack is intrinsic to a surface of a conductive layer of the composite current collector, but such crack cannot be observed on a surface of a conventional metal

TABLE 8

| Electrode plate No. | Current collector No. | Support layer | | Conductive layer | | Primer layer (interior area) | Upper active material layer (exterior area) |
|---|---|---|---|---|---|---|---|
| | | Material | D1 | Material | D2 | | |
| Positive electrode plate 33 | Positive electrode current collector 4 | PET | 10 μm | Al | 1 μm | 65% conductive carbon black, 35% water-based PVDF, and 1.5 μm thickness | NCM811, 6.5 μm D50, 55 μm active material layer thickness, and 0.5 wt % conductive agent PVDF content |
| Positive electrode plate 34 | Positive electrode current collector 4 | PET | 10 μm | Al | 1 μm | 65% conductive carbon black, 35% water-based PVDF, and 1.5 μm thickness | NCM811, 6.5 μm D50, 55 μm active material layer thickness, and 1 wt % conductive agent PVDF content |
| Positive electrode plate 35 | Positive electrode current collector 4 | PET | 10 μm | Al | 1 μm | 65% conductive carbon black, 35% water-based PVDF, and 1.5 μm thickness | NCM811, 6.5 μm D50, 55 μm active material layer thickness, and 2 wt % conductive agent PVDF content |
| Positive electrode plate 36 | Positive electrode current collector 4 | PET | 10 μm | Al | 1 μm | 65% conductive carbon black, 35% water-based PVDF, and 1.5 μm thickness | NCM811, 6.5 μm D50, 55 μm active material layer thickness, and 3 wt % conductive agent PVDF content | current collector. When the conductive layer of the composite current collector is thin, a crack easily occurs when a pressure is applied to the conductive layer in a cold-pressing process during electrode plate machining. In this case, if there is a conductive primer layer (that is, an interior area), a conductive network between the current collector and an active substance may be effectively repaired and established to improve electronic transmission efficiency, and reduce resistance between the current collector and an electrode active material layer. Therefore, direct current resistance in a cell can be effectively reduced, power performance of the cell is improved, and it is ensured that phenomena such as great polarization and lithium precipitation do not easily occur in a long cycling process of the cell, that is, long-term reliability of the cell is effectively improved. Specifically, this is reflected as a significant slowdown of DCR growth and an improvement of battery performance. The foregoing observation result provides a possible theoretical explanation about a functional mechanism of the conductive primer layer, but it should be understood that this application is not limited to this specific theoretical explanation.

A person skilled in the art may understand that the foregoing shows an application example of an electrode plate only by using a lithium battery as an example in this application; however, the electrode plate in this application may also be applied to another type of battery or electrochemical apparatus, and a good technical effect of this application can still be achieved.

According to the disclosure and instruction of this specification, a person skilled in the art of this application may further make appropriate changes or modifications to the foregoing embodiments. Therefore, this application is not limited to the foregoing disclosure and the described specific embodiments, and some changes or modifications to this application shall also fall within the protection scope of the claims of this application. In addition, although some specific terms are used in this specification, these terms are used only for ease of description, and do not constitute any limitation on this application.

What is claimed is:

1. An electrode plate, comprising:
    a current collector, the current collector comprising:
        a support layer;
        a lower protective layer disposed on the support layer, the lower protective layer comprising a metal, a metal oxide, or both;
        a conductive layer disposed on the lower protective layer; and
        an upper protective layer disposed on the conductive layer, the upper protective layer comprising a metal, a metal oxide, or both, and
    an electrode active material layer disposed on the upper protective layer,
    wherein a thickness D1 of the support layer satisfies 1 µm≤D1≤30 µm, a single-side thickness D2 of the conductive layer satisfies 30 nm≤D2≤2 µm, a thickness D3 of the upper protection layer satisfies D3≤1/10 D2 and 1 nm≤D3≤200 nm, a thickness D3" of the lower protection layer is less than D3 of the upper protection layer and satisfies 1/2D3≤D3"≤4/5D3,
    wherein the electrode active material layer comprises an electrode active material, a binder, and a conductive agent, the electrode active material layer is further divided into an interior area and an exterior area in a thickness direction, the conductive agent in the electrode active material layer is unevenly distributed in a thickness direction of the electrode active material layer, and based on a total weight of the electrode active material layer, a weight percentage of the conductive agent in the interior area of the electrode active material layer is higher than a weight percentage of the conductive agent in the exterior area of the electrode active material layer, the weight percentage of the conductive agent in the interior area is at least 50%, the weight percentage of the binder in the interior area is 20% to 50%, the weight percentage of the electrode active material in the interior area is no more than 50%, based on the total weight of the interior area, and
    wherein a thickness H of the interior area is 0.1 µm to 5 µm, and a ratio of H to D2 is 0.5:1 to 5:1.

2. The electrode plate according to claim 1, wherein the conductive layer is a metal conductive layer, and a material of the metal conductive layer is selected from at least one of aluminum, copper, nickel, titanium, silver, a nickel-copper alloy, and an aluminum-zirconium alloy;
    a material of the support layer is selected from at least one of an insulating polymeric material, an insulating polymeric composite material, a conductive polymeric material, and a conductive polymeric composite material;
    the insulating polymeric material is selected from at least one of polyamide, polyterephthalate, polyimide, polyethylene, polypropylene, polystyrene, polyvinyl chloride, aramid fiber, polydiformylphenylenediamine, acrylonitrile-butadiene-styrene copolymer, polybutylene terephthalate, poly-p-phenylene terephthamide, polypropylene ethylene), polyoxymethylene, epoxy resin, phenolic resin, polytetrafluoroethylene, p-phenylene sulfide, polyvinylidene fluoride, silicon rubber, polycarbonate, cellulose and a derivative thereof, amylum and a derivative thereof, protein and a derivative thereof, polyvinyl alcohol and a crosslinking agent thereof, and polyethylene glycol and a crosslinking agent thereof;
    the insulating polymeric composite material is selected from a composite material formed by an insulating polymeric material and an inorganic material, wherein the inorganic material is selected from at least one of a ceramic material, a glass material, and a ceramic composite material;
    the conductive polymeric material is selected from a polymeric polysulfur nitride material, or a doped conjugated polymeric material, for example, at least one of polypyrrole, polyacetylene, polyaniline, and polythiophene;
    the conductive polymeric composite material is selected from a composite material formed by an insulating polymeric material and a conductive material, wherein the conductive material is selected from at least one of a conductive carbon material, a metal material, and a composite conductive material, the conductive carbon material is selected from at least one of carbon black, a carbon nano-tube, graphite, acetylene black, and graphene, the metal material is selected from at least one of nickel, iron, copper, aluminum, or an alloy thereof, and the composite conductive material is selected from at least one of nickel-coated graphite powder and nickel-coated carbon fiber; and
    the material of the support layer is an insulating polymeric material or an insulating polymeric composite material.

3. The electrode plate according to claim 1, wherein a room-temperature Young's modulus E of the support layer satisfies 20 Gpa≥E≥4 Gpa.

4. The electrode plate according to claim 1, wherein the thickness D1 of the support layer satisfies $1\ \mu m \le D1 \le 15\ \mu m$.

5. The electrode plate according to claim 1, wherein the single-side thickness D2 of the conductive layer satisfies $300\ nm \le D2 \le 2\ \mu m$.

6. The electrode plate according to claim 1, wherein the single-side thickness D2 of the conductive layer satisfies $500\ nm \le D2 \le 1.5\ \mu m$.

7. The electrode plate according to claim 1, wherein the thickness D3 of the protection layer satisfies, $10\ nm \le D3 \le 50\ nm$.

8. The electrode plate according to claim 1, wherein
the conductive agent is at least one of a conductive carbon material and a metal material, wherein the conductive carbon material is selected from at least one of zero-dimensional conductive carbon such as acetylene black or conductive carbon black, one-dimensional conductive carbon such as a carbon nano-tube, two-dimensional conductive carbon such as conductive graphite or graphene, and three-dimensional conductive carbon such as reduced graphene oxide, and the metal material is selected from at least one of aluminum powder, iron powder, and silver powder; and
the binder is selected from at least one of styrene butadiene rubber, oil-based polyvinylidene fluoride (PVDF), polyvinylidene fluoride copolymer (for example, PVDF-HFP copolymer or PVDF-TFE copolymer), sodium carboxymethyl celulose, polystyrene, polyacrylic acid, polytetrafluoroethylene, polyacrylonitrile, polyimide, water-based PVDF, polyurethane, polyvinyl alcohol, polyacrylate, polyacrylic-acid-polyacrylonitrile copolymer, and polyacrylate-polyacrylonitrile copolymer.

9. The electrode plate according to claim 1, wherein the conductive agent in the interior area comprises a two-dimensional conductive carbon material.

10. The electrode plate according to claim 9, wherein the two-dimensional conductive carbon material in the interior area accounts for 1 wt % to 50 wt % of the conductive agent in the interior area.

11. The electrode plate according to claim 9, wherein a particle diameter D50 of the two-dimensional conductive carbon material is 0.01 μm to 0.1 μm.

12. The electrode plate according to claim 9, wherein the binder in the interior area comprises a water-based binder, for example, at least one of water-based PVDF, polyacrylic acid, polyurethane, polyvinyl alcohol, polyacrylate, polyacrylic-acid-polyacrylonitrile copolymer, and polyacrylate-polyacrylonitrile copolymer.

13. The electrode plate according to claim 1, wherein an average particle diameter D50 of the electrode active material is 5 μm to 15 μm.

14. The electrode plate according to claim 1, wherein based on a total weight of the electrode active material layer in the exterior area, a weight percentage of the binder in the exterior area is not less than 1 wt %.

15. The electrode plate according to claim 1, wherein the electrode plate is a positive electrode plate, and the active electrode material layer comprises at least one of lithium cobalt oxide, lithium nickel oxide, lithium manganese oxide, lithium nickel manganese oxide, lithium nickel cobalt manganese oxide, lithium nickel cobalt aluminum oxide, transition metal phosphate, and lithium iron phosphate.

16. The electrode plate according to claim 1, wherein the electrode plate is a negative electrode plate, and the active electrode material layer comprises at least one of graphite, conductive carbon black, carbon fiber, metal, semimetal, and metal alloy.

\* \* \* \* \*